US011785059B1

(12) United States Patent
Balaji

(10) Patent No.: US 11,785,059 B1
(45) Date of Patent: Oct. 10, 2023

(54) FACILITATING INTERACTION AMONG PARTICIPANTS AT DIFFERENT LOCATIONS

(71) Applicant: Microsoft Technology Licensing, LLC, Redmond, WA (US)

(72) Inventor: Deepika Balaji, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/848,353

(22) Filed: Jun. 23, 2022

(51) Int. Cl.

| | |
|---|---|
| ***G06F 3/0481*** | (2022.01) |
| ***H04L 65/401*** | (2022.01) |
| ***H04L 67/50*** | (2022.01) |
| ***G06F 3/0484*** | (2022.01) |

(52) U.S. Cl.
CPC ........ *H04L 65/4015* (2013.01); *G06F 3/0481* (2013.01); *G06F 3/0484* (2013.01); *H04L 67/535* (2022.05); *G06F 2203/04803* (2013.01)

(58) Field of Classification Search
CPC . H04L 65/4015; H04L 67/535; G06F 3/0481; G06F 3/0484; G06F 2203/04803
See application file for complete search history.

(56) References Cited

U.S. PATENT DOCUMENTS 6,507,845 B1 * 1/2003 Cohen .................... G06Q 10/10 707/613
9,705,967 B2 7/2017 Savage et al.
10,264,081 B2 4/2019 Guo et al.
2004/0003294 A1 * 1/2004 Moore .................. G06F 21/552 726/21
2007/0294348 A1 12/2007 Cohen et al.
2009/0228555 A1 * 9/2009 Joviak .................. G06Q 10/109 709/205
2013/0159432 A1 * 6/2013 Deering ............... G06Q 10/107 709/206
2013/0275429 A1 * 10/2013 York ..................... G06F 16/435 707/E17.002

(Continued)

OTHER PUBLICATIONS

Haas, Martine "5 Challenges of Hybrid Work—and How to Overcome Them," available at https://hbr.org/2022/02/5-challenges-of-hybrid-work-and-how-to-overcome-them, Harvard Business Review, Feb. 15, 2022, 9 pages.

(Continued)

*Primary Examiner* — Jeanette J Parker

(57) ABSTRACT

Technology is described for assisting a user in identifying relevant participants to a communication session. The technology detects that the user has interacted with a user interface (UI) presentation in a specified manner. The technology then receives context information that describes the current context of the user's interaction. The technology uses the context information to interrogate a graph to identify one or more candidate participants that may be added to the communication session. The technology then generates a UI collaboration pane for presentation on the UI presentation. The UI collaboration pane provides a mechanism by which the user can add one or more of the candidate participants to the communication session without disrupting the user's focus on a task at hand, and with minimal user interface actions required by the user. Further, the UI collaboration pane gives the user plural options to establish communication with the candidate participants.

20 Claims, 9 Drawing Sheets

(56) References Cited

U.S. PATENT DOCUMENTS

| | | | | |
|---|---|---|---|---|
| 2018/0115603 | A1* | 4/2018 | Hu | G06Q 50/01 |
| 2018/0131731 | A1* | 5/2018 | Jones | H04L 65/1059 |
| 2019/0057145 | A1* | 2/2019 | Huang | G06N 20/00 |
| 2021/0406449 | A1 | 12/2021 | Meling et al. | |
| 2022/0116434 | A1* | 4/2022 | Mayfield | H04L 65/1089 |

OTHER PUBLICATIONS

Cox, Josie, "More Than Just #FOMO: How Hybrid Workplace Models Exacerbate Gender Inequality," available at https://www.forbes.com/sites/josiecox/2021/06/04/more-than-just-fomo-how-hybrid-workplace-models-exacerbate-gender-inequality/?sh=55ac4d155d1a, Forbes, Jun. 4, 2021, 6 pages.

"UI Automation Overview," available at https://docs.microsoft.com/en-us/windows/win32/winauto/uiauto-uiautomationoverview, Microsoft Docs, Microsoft Corporation, Redmond, WA, Aug. 19, 2021, 6 pages.

"UI Automation Clients Overview," available at https://docs.microsoft.com/en-us/windows/win32/winauto/uiauto-clientsoverview, Microsoft Docs, Microsoft Corporation, Redmond, WA, Aug. 19, 2020, 4 pages.

"IUIAutomation interface (uiautomationclient.h)," available at https://docs.microsoft.com/en-us/windows/win32/api/uiautomationclient/nn-uiautomationclient-iuiautomation, WMicrosoft Docs, Microsoft Corporation, Redmond, WA, Oct. 5, 2021, 9 pages.

"IUIAutomationElement interface (uiautomationclient.h)," available at https://docs.microsoft.com/en-us/windows/win32/api/uiautomationclient/nn-uiautomationclient-iuiautomationelement, Microsoft Docs, Microsoft Corporation, Redmond, WA, Oct. 5, 2021, 11 pages.

"Obtaining UI Automation Elements," available at https://docs.microsoft.com/en-us/windows/win32/winauto/uiauto-obtainingelements, Microsoft Docs, Microsoft Corporation, Redmond, WA, Mar. 19, 2021, 7 pages.

"Overview of Microsoft Graph," available at https://docs.microsoft.com/en-us/graph/overview, Microsoft Docs, Microsoft Corporation, Redmond, WA, May 18, 2022, 8 pages.

"UI Automation Tree Overview," available at https://docs.microsoft.com/en-us/windows/win32/winauto/uiauto-treeoverview, Microsoft Docs, Microsoft Corporation, Redmond, WA, Aug. 23, 2019, 6 pages.

"Accessibility tools—AccEvent (Accessible Event Watcher)," available at https://docs.microsoft.com/en-us/windows/win32/winauto/accessible-event-watcher, Microsoft Docs, Microsoft Corporation, Redmond, WA, Aug. 19, 2020, 8 pages.

"UI Automation Events Overview," available at https://docs.microsoft.com/en-us/windows/win32/winauto/uiauto-eventsoverview, Microsoft Docs, Microsoft Corporation, Redmond, WA, Aug. 19, 2020, 3 pages.

"Office Online—chat with your co-editors in real-time," available at https://www.microsoft.com/en-us/microsoft-365/blog/2016/05/25/office-online-chat-with-your-co-editors-in-real-time/, Microsoft 365, Microsoft Corporation, Redmond, WA, May 25, 2016, 4 pages.

Li, et al., "Using User Contextual Profile for Recommendation in Collaborations," available at https://hal.archives-ouvertes.fr/hal-03218720/document, available at https://hal.archives-ouvertes.fr/hal-03218720/document, Research and Innovation Forum 2019, Apr. 2019, 11 pages.

Lopes, et al., "Collaboration Recommendation on Academic Social Networks," available at https://link.springer.com/chapter/10.1007/978-3-642-16385-2_24, Advances in Conceptual Modeling—Applications and Challenges, ER 2010, Lecture Notes in Computer Science, vol. 6413, only first two pages.

Search Report and Written Opinion for PCT Application No. PCT/US2023/021821, dated Jul. 13, 2023, 14 pages.

* cited by examiner

Figure 7:
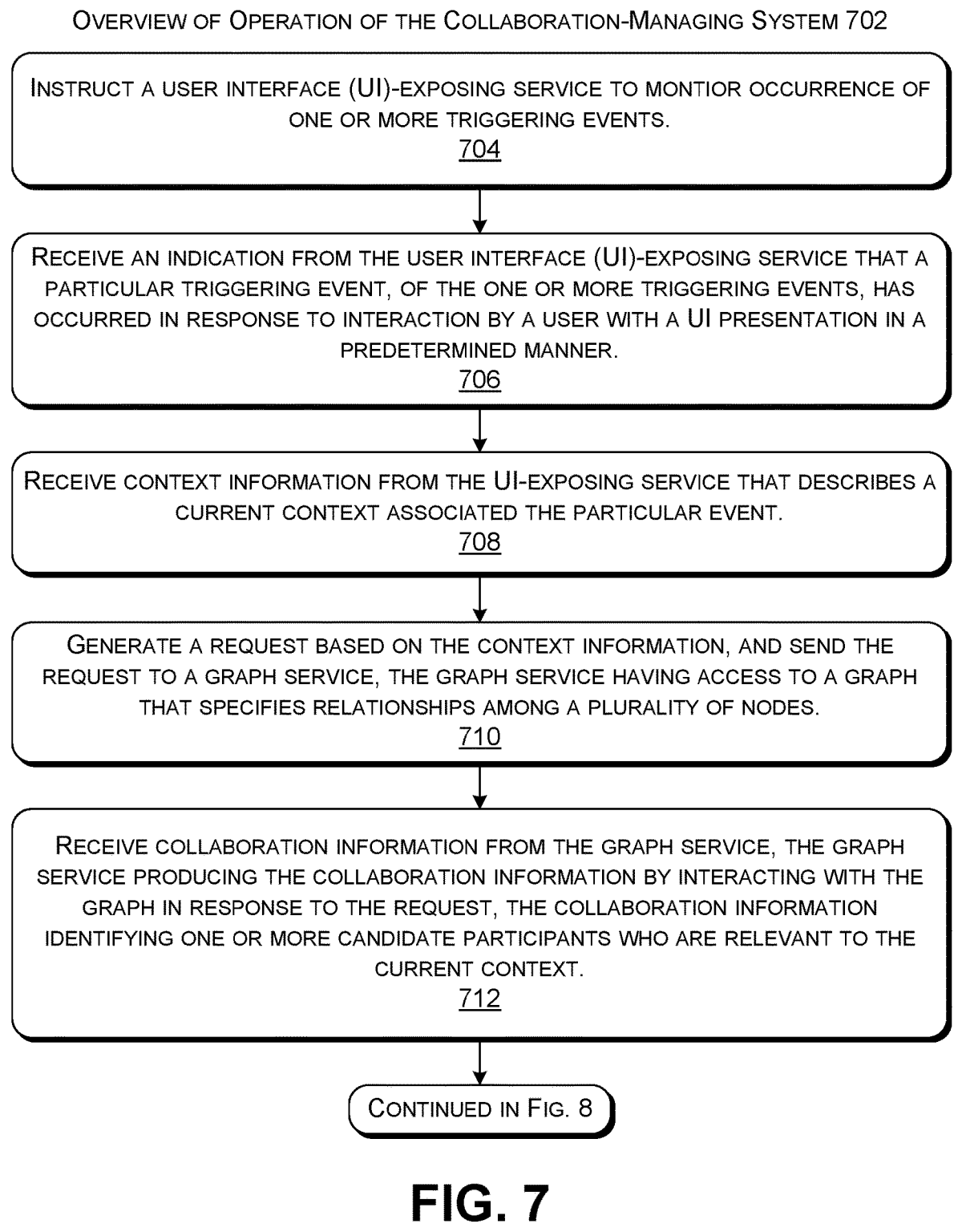

OVERVIEW OF OPERATION OF THE COLLABORATION-MANAGING SYSTEM 702

INSTRUCT A USER INTERFACE (UI)-EXPOSING SERVICE TO MONTIOR OCCURRENCE OF ONE OR MORE TRIGGERING EVENTS.
704

RECEIVE AN INDICATION FROM THE USER INTERFACE (UI)-EXPOSING SERVICE THAT A PARTICULAR TRIGGERING EVENT, OF THE ONE OR MORE TRIGGERING EVENTS, HAS OCCURRED IN RESPONSE TO INTERACTION BY A USER WITH A UI PRESENTATION IN A PREDETERMINED MANNER.
706

RECEIVE CONTEXT INFORMATION FROM THE UI-EXPOSING SERVICE THAT DESCRIBES A CURRENT CONTEXT ASSOCIATED THE PARTICULAR EVENT.
708

GENERATE A REQUEST BASED ON THE CONTEXT INFORMATION, AND SEND THE REQUEST TO A GRAPH SERVICE, THE GRAPH SERVICE HAVING ACCESS TO A GRAPH THAT SPECIFIES RELATIONSHIPS AMONG A PLURALITY OF NODES.
710

RECEIVE COLLABORATION INFORMATION FROM THE GRAPH SERVICE, THE GRAPH SERVICE PRODUCING THE COLLABORATION INFORMATION BY INTERACTING WITH THE GRAPH IN RESPONSE TO THE REQUEST, THE COLLABORATION INFORMATION IDENTIFYING ONE OR MORE CANDIDATE PARTICIPANTS WHO ARE RELEVANT TO THE CURRENT CONTEXT.
712

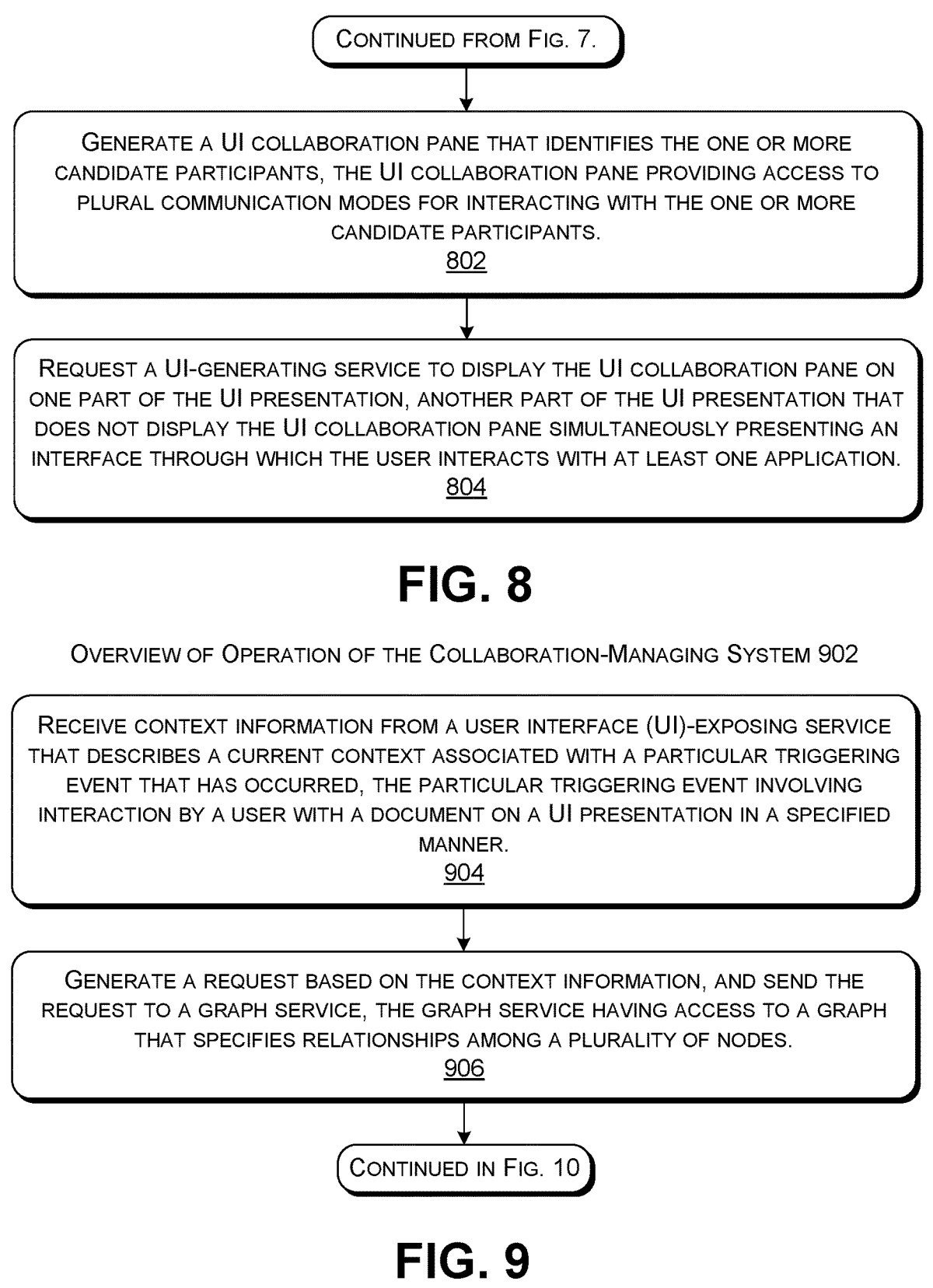

CONTINUED FROM FIG. 7.

GENERATE A UI COLLABORATION PANE THAT IDENTIFIES THE ONE OR MORE CANDIDATE PARTICIPANTS, THE UI COLLABORATION PANE PROVIDING ACCESS TO PLURAL COMMUNICATION MODES FOR INTERACTING WITH THE ONE OR MORE CANDIDATE PARTICIPANTS.
802

REQUEST A UI-GENERATING SERVICE TO DISPLAY THE UI COLLABORATION PANE ON ONE PART OF THE UI PRESENTATION, ANOTHER PART OF THE UI PRESENTATION THAT DOES NOT DISPLAY THE UI COLLABORATION PANE SIMULTANEOUSLY PRESENTING AN INTERFACE THROUGH WHICH THE USER INTERACTS WITH AT LEAST ONE APPLICATION.
804

FIG. 8

OVERVIEW OF OPERATION OF THE COLLABORATION-MANAGING SYSTEM 902

RECEIVE CONTEXT INFORMATION FROM A USER INTERFACE (UI)-EXPOSING SERVICE THAT DESCRIBES A CURRENT CONTEXT ASSOCIATED WITH A PARTICULAR TRIGGERING EVENT THAT HAS OCCURRED, THE PARTICULAR TRIGGERING EVENT INVOLVING INTERACTION BY A USER WITH A DOCUMENT ON A UI PRESENTATION IN A SPECIFIED MANNER.
904

GENERATE A REQUEST BASED ON THE CONTEXT INFORMATION, AND SEND THE REQUEST TO A GRAPH SERVICE, THE GRAPH SERVICE HAVING ACCESS TO A GRAPH THAT SPECIFIES RELATIONSHIPS AMONG A PLURALITY OF NODES.
906

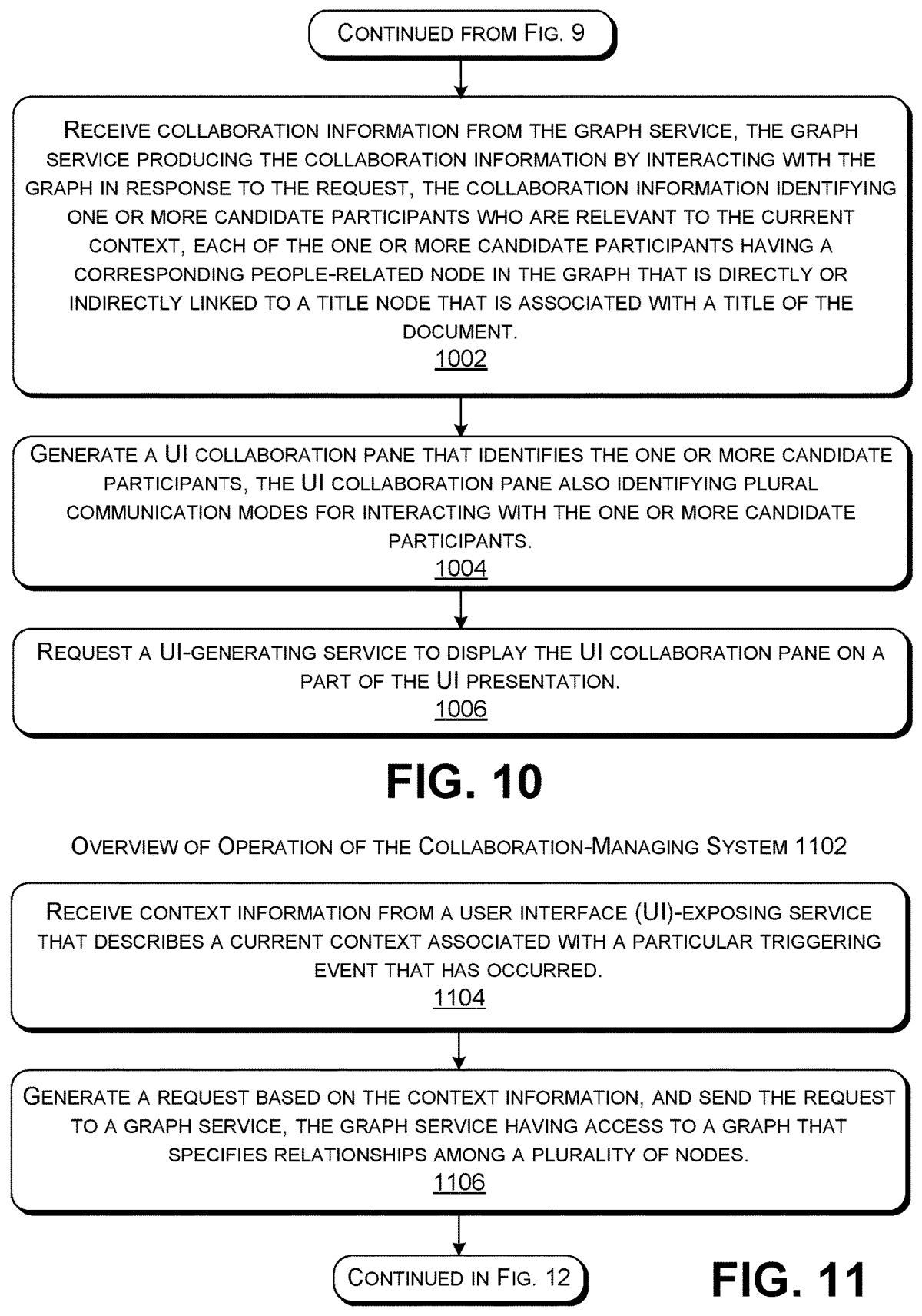

CONTINUED FROM FIG. 9

RECEIVE COLLABORATION INFORMATION FROM THE GRAPH SERVICE, THE GRAPH SERVICE PRODUCING THE COLLABORATION INFORMATION BY INTERACTING WITH THE GRAPH IN RESPONSE TO THE REQUEST, THE COLLABORATION INFORMATION IDENTIFYING ONE OR MORE CANDIDATE PARTICIPANTS WHO ARE RELEVANT TO THE CURRENT CONTEXT, EACH OF THE ONE OR MORE CANDIDATE PARTICIPANTS HAVING A CORRESPONDING PEOPLE-RELATED NODE IN THE GRAPH THAT IS DIRECTLY OR INDIRECTLY LINKED TO A TITLE NODE THAT IS ASSOCIATED WITH A TITLE OF THE DOCUMENT.
1002

GENERATE A UI COLLABORATION PANE THAT IDENTIFIES THE ONE OR MORE CANDIDATE PARTICIPANTS, THE UI COLLABORATION PANE ALSO IDENTIFYING PLURAL COMMUNICATION MODES FOR INTERACTING WITH THE ONE OR MORE CANDIDATE PARTICIPANTS.
1004

REQUEST A UI-GENERATING SERVICE TO DISPLAY THE UI COLLABORATION PANE ON A PART OF THE UI PRESENTATION.
1006

FIG. 10

OVERVIEW OF OPERATION OF THE COLLABORATION-MANAGING SYSTEM 1102

RECEIVE CONTEXT INFORMATION FROM A USER INTERFACE (UI)-EXPOSING SERVICE THAT DESCRIBES A CURRENT CONTEXT ASSOCIATED WITH A PARTICULAR TRIGGERING EVENT THAT HAS OCCURRED.
1104

GENERATE A REQUEST BASED ON THE CONTEXT INFORMATION, AND SEND THE REQUEST TO A GRAPH SERVICE, THE GRAPH SERVICE HAVING ACCESS TO A GRAPH THAT SPECIFIES RELATIONSHIPS AMONG A PLURALITY OF NODES.
1106

CONTINUED FROM FIG. 11

RECEIVE COLLABORATION INFORMATION FROM THE GRAPH SERVICE, THE GRAPH SERVICE PRODUCING THE COLLABORATION INFORMATION BY INTERACTING WITH THE GRAPH IN RESPONSE TO THE REQUEST, THE COLLABORATION INFORMATION IDENTIFYING ONE OR MORE CANDIDATE PARTICIPANTS WHO ARE RELEVANT TO THE CURRENT CONTEXT.
1202

GENERATE A UI COLLABORATION PANE THAT IDENTIFIES THE ONE OR MORE CANDIDATE PARTICIPANTS, THE UI COLLABORATION PANE ALSO IDENTIFYING PLURAL COMMUNICATION MODES FOR INTERACTING WITH THE ONE OR MORE CANDIDATE PARTICIPANTS.
1204

REQUEST A UI-GENERATING SERVICE TO DISPLAY THE UI COLLABORATION PANE ON THE UI PRESENTATION, WHEREIN A PARTICULAR COMMUNICATION MODE AMONG THE PLURALITY OF COMMUNICATION MODES ALLOWS THE USER TO ADD A PARTICULAR CANDIDATE PARTICIPANT, OF THE ONE OR MORE CANDIDATE PARTICIPANTS, TO A SYNCHRONOUS COMMUNICATION SESSION, WHEREIN ACTIVATION OF THE PARTICULAR COMMUNICATION MODE WILL INVOKE A CALL TO THE PARTICULAR CANDIDATE PARTICIPANT, AND WHEREIN ANOTHER PARTICULAR COMMUNICATION MODE AMONG THE PLURALITY OF COMMUNICATION MODES ALLOWS THE USER TO GENERATE A RECORDING OF THE COMMUNICATION SESSION OR TO GENERATE A TEXT MESSAGE, AND THEN TO SEND THE RECORDING OR TEXT MESSAGE TO THE PARTICULAR CANDIDATE PARTICIPANT.
1206

FIG. 12

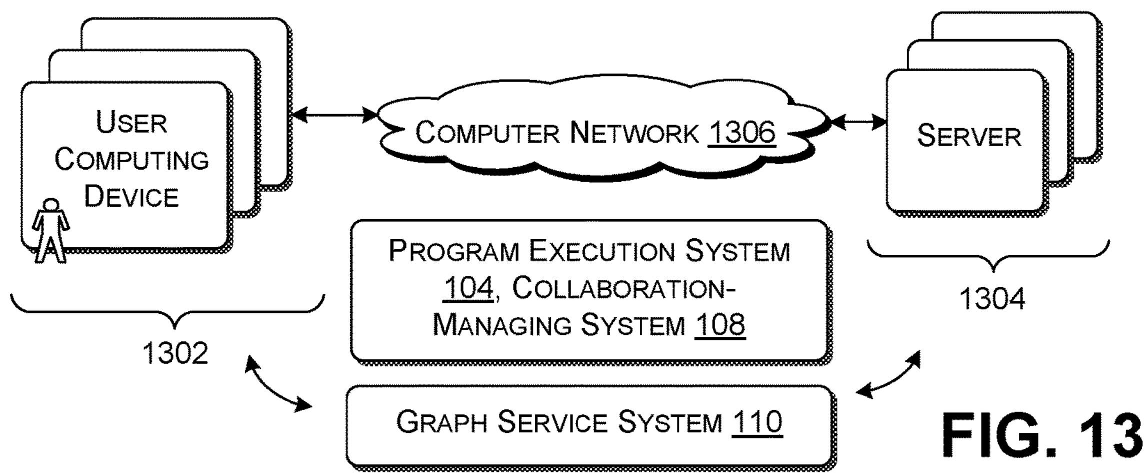

FIG. 13

FACILITATING INTERACTION AMONG PARTICIPANTS AT DIFFERENT LOCATIONS

BACKGROUND

Recent events have fundamentally changed the nature of many work environments. For instance, a subset of a workforce may continue to work at a main office or campus, while the remainder may be widely dispersed across various locations. This working arrangement introduces challenges in providing robust interaction among work groups. For example, a group of workers who continue to meet at the main office may grow accustomed to solving problems among themselves, overlooking the fact that there may be relevant contributors to a discussion who have not yet returned to the main office. Video conferencing tools exist to facilitate interaction among geographically dispersed communication participants. Yet it remains the responsibility of workgroups to remember that out-of-office workers exist and may have relevant feedback regarding a matter at hand. It further remains the responsibility of conference organizers to manually add these out-of-office workers to communication sessions.

SUMMARY

According to illustrative aspects, a collaboration-managing system is described herein for assisting a user in identifying relevant participants to a communication session, any of which may be dispersed across a wide geographical area. The collaboration-managing system detects when the user interacts with a user interface (UI) presentation in a specified manner. The collaboration-managing system then receives context information that describes the current context of the user's interaction with the UI presentation. The collaboration-managing system uses the context information to interrogate a graph provided by a graph service to identify one or more candidate participants who may be added to the communication session. The collaboration-managing system then generates a UI collaboration pane for presentation on the UI presentation. The UI collaboration pane provides a mechanism by which the user can add one or more of the candidate participants to the communication session without disrupting the user's focus on a task at hand, and with minimal user interface actions required by the user.

According to additional illustrative aspects, the collaboration-managing system instructs a UI-exposing service to monitor one or more triggering events. In an example, monitoring one or more triggering events includes the acts of waiting and watching for the occurrence of these events. Subsequently, the UI-exposing service alerts the collaboration-managing system when it encounters one of the triggering events. For example, one such triggering event occurs when the user opens a document, or when the user opens a document in a particular mode (e.g., a review mode). Another triggering event occurs when the user moves to the "To" field of a message (e.g., an Email message) being composed. The UI-exposing service then provides context information to the collaboration-managing system that describes the current context in which the triggering event has occurred. For example, the context information specifies the title of a document that the user has opened in the review mode. This technique for detecting triggering events can be adapted to any type of application without requiring knowledge of or access to an application's program instructions, and therefore has the technical advantage of being a scalable solution.

According to additional illustrative aspects, the graph service first identifies one or more direct collaborators (if any) that are associated with the title. That is, assume that the title of a document opened in the review mode is associated with a particular title node in a graph. The direct collaborators are associated with corresponding nodes that are directly linked to the title node in the graph. Optionally, the graph service identifies indirect collaborators who are associated with corresponding topic nodes in the graph, where those topic nodes, in turn, are linked to the title node.

According to additional illustrative aspects, the UI collaboration pane gives the user plural communication options to interact with the candidate participants. For example, the UI collaboration pane provides a mechanism for establishing a synchronous communication session (e.g., a phone call or video conference) with any of the candidate participants, for sending a text message to any of the candidate participants, for creating a voice recording and/or screen recording and then sending the recording(s) to the candidate participants, etc.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 7-12 show three illustrative processes performed by a collaboration-managing system, which is another part of the computing system of FIG. 1.

FIG. 13 shows computing equipment that can be used to implement the computing system shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an example computing system for assisting a user in identifying and interacting with communication participants. Section B sets forth illustrative methods that explain the operation of the computing system of Section A. And Section C describes illustrative computing functionality that can be used to implement any aspect of the features described in Sections A and B.

A. Illustrative Computing System

Figure 1:
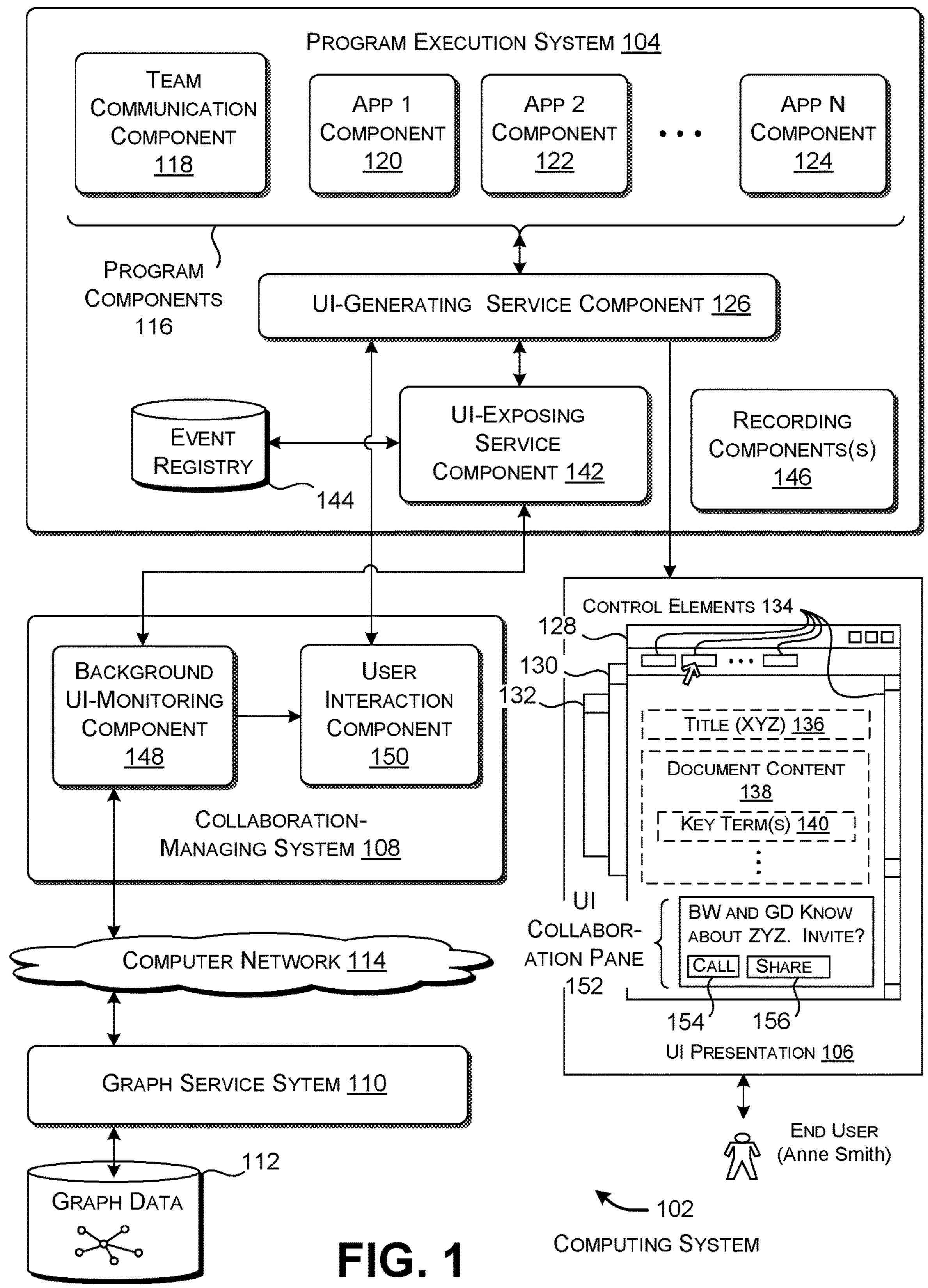
FIG. 1 shows an illustrative computing system for facilitating interaction with geographically dispersed communication participants.

FIG. 1 shows a computing system 102 that detects the occurrence of a predetermined triggering condition, and, in response thereto, identifies one or more candidate participants who may be added to a communication session that is in progress or is yet to be set up. The computing system 102 also facilitates adding the candidate participants to the communication session in an efficient manner, e.g., by requiring minimal user interface actions on the part of the user. This is in contrast with a manual mode of adding new participants to a communication session, which may involve complex and inefficient user interface actions involving interaction with plural applications. The computing system 102 further gives the user plural communication options to interact with the communication participants.

The computing system 102 is particularly useful in alerting an in-office group of communication participants of the existence of additional relevant contributors to a discussion, some of whom may work at remote settings (relative to a main office setting). The technology described below addresses this problem, but is not limited thereto; it applies to any collection of communication participants regardless of their respective locations. For instance, the technology applies to the case in which all of the communication participants work together in the same physical location. It also applies to the case in which none of the communication participants work at a main office location or the same physical location.

The computing system 102 includes a program execution system 104 for executing one or more computer programs. For instance, without limitation, the program execution system 104 may correspond to a user computing device of any type, such as a desktop computing device, a handheld computing device of any type, a game console device, a virtual or mixed-reality device of any type, and so on. The program execution system 104 provides a user interface (UI) presentation 106 on a display device. An end user (e.g., a hypothetical user named "Anne Smith") is currently interacting with the program execution system 104 via the UI presentation 106.

A collaboration-managing system 108 performs the core task of identifying candidate participants to add to the communication session, and then notifying the user of the existence of the candidate participants. The collaboration-managing system 108 then facilitates adding the candidate participants to the communication session. The collaboration-managing system 108 allows the user to choose from among plural modes of communication to add the candidate participants.

To perform the above tasks, the collaboration-managing system 108 interacts with a graph service system 110. The graph service system 110, in turn, has access to a graph provided in a data store 112. The graph includes a plurality of nodes connected together by edges. The nodes represent entities such as potential communication participants, topics, documents, etc. The edges represent relationships among the entities. As will be described more fully below, the graph service system 110 finds a starting node in the graph that is associated with context information specified by the collaboration-managing system 108. The graph service system 110 then identifies one or more candidate participants having respective nodes that are linked either directly or indirectly to the starting node.

In some implementations, the collaboration-managing system 108 is implemented as a program component of the program execution system 104 itself. In contrast, the graph service system 110 may be implemented by one or more servers. The collaboration-managing system 108 may interact with the graph service system 110 over a computer network 114 of any type. For instance, without limitation, the collaboration-managing system 108 may interact with the graph service system 110 via RESTful APIs (Representational State Transfer Application Programming Interfaces).

With the above introduction, each of the above-described parts of the computing system 102 will be described below in greater detail. Starting with the program execution system 104, this system hosts a number of program components 116. For instance, the program execution system 104 can locally store and execute machine-readable instructions that implement the program components 116. In addition, or alternatively, one or more of the program components 116 may be implemented by logic running on one or more remote servers. Users can access the remote logic using a browser program provided by the program execution system 104.

One program component is a team communication component 118 that facilitates interaction among groups of communication participants through integrated video conferencing functionality, text message functionality, and other features. For example, the team communication component 118 may represent the TEAMS service provided by MICROSOFT CORPORATION of Redmond, Wash. In some implementations, the collaboration-managing system 108 can be implemented as an add-on to the team communication component 118. The program components 116 also include one or more other application components, such as app 1 component 120, app 2 component 122, and app N component 124. For instance, without limitation, any of the application components (120, 122, . . . , 124) may represent a word processing program, a browser program, a spreadsheet program, a slide deck presentation program, a PDF (Portable Document Format) viewer or editing program, and so on. Although not shown, the program components 116 also include logic executed by an operating system (not shown) of the program execution system 104.

A UI-generating service component 126 generates the UI presentation 106. The UI presentation 106 provides a mechanism by which the user may interact with the program components 116. In the merely illustrative case of FIG. 1, the UI presentation shows that the user is currently interacting with three program components via respective windows (128, 130, 132). The user is specifically currently interacting with a word processing program via the window 128, which is referred below as the in-focus window 128. The UI-generating service component 126 presents the in-focus window 128 overlaid on top of the other windows (130, 132).

In the merely illustrative case of FIG. 1, the in-focus window 128 includes a collection of control elements 134 with which the user may interact with the word processing program to perform navigation and editing operations. The window 128 currently shows a particular document having a document title 136 and document contents 138. The document title 136 (e.g., the generic title "XYZ") may correspond to the file name of the document. The word processing program may display the title 136 in any region of the window 128, such as in the top margin of the window 128. The contents 138 include one or more key terms 140. In other examples, without limitation, a window can present: a document produced by a spreadsheet program; a document rendered by a PDF viewer; a document produced by a slide presentation program; a page produced by a browser program; an interface portal produced by the team communication component 118, and so on.

A UI-exposing service component 142 enumerates the elements of the UI presentation 106, and exposes the contents of the UI presentation 106 to various consuming applications. For example, one consuming application may correspond to any type of assistive technology (AT) program that facilitates interaction with the UI presentation in a non-traditional manner. For instance, one AT program may correspond to a screen reader that enumerates the contents of the UI presentation 106 in spoken form. Another consuming application may correspond to a testing program that is configured to test the functionality of the UI presentation 106. In one non-limiting case, the UI-exposing service component 142 specifically represents the MICROSOFT UI AUTOMATION functionality provided by MICROSOFT CORPORATION. A consuming application may interact with the UI-exposing service component 142 via APIs provided by the UI-exposing service component 142.

The UI-exposing service component 142 expresses the UI presentation 106 as a collection of features found in the UI presentation 106, arranged in a hierarchical data structure. A simplified example of one such hierarchical representation will be described in greater detail below with reference to FIG. 3. The UI-exposing service component 142 performs this task based on cues added by the developer(s) who created an application's machine-readable instructions.

The UI-exposing service component 110 can perform various functions using the hierarchical representation. For instance, the UI-exposing service component 142 can read out or otherwise provide information regarding any selected part of the UI presentation 106 upon request, including any particular feature in the UI presentation 106 or the entire UI presentation 106. In addition, the UI-exposing service component 142 can be instructed by any requesting entity to monitor one or more triggering events. In response, the UI-exposing service component 142 stores information in a data store 144 that identifies the triggering events that it has been instructed to monitor. Upon occurrence of one of these triggering events, the UI-exposing service component 142 notifies the requesting entity that the triggering event has occurred.

One or more recording components 146 enable a user to record a communication session. For example, a voice recording component enables the user to record the audio and/or video portion of a communication session. A screen capture recording component enables the user to record the user's (or any communication participant's) interaction with the UI presentation 106 during a communication session.

Now advancing to collaboration-managing system 108, a background UI-monitoring component 148 instructs the UI-exposing service component 142 to monitor triggering events, upon which the UI-exposing service stores information in the data store 144 that identifies the triggering events. The background UI-monitoring component 148 thereafter enters a monitoring state, in which it remains active in the background of any other task that the user happens to be performing using the program execution system 104. The background UI-monitoring component 148 receives context information from the UI-exposing service component 142 when one of these triggering events has occurred. The context information describes a context associated with the triggering event that has occurred.

For example, assume that the triggering event corresponds to an occurrence in which a user opens up a document in a word processing program, or the user more specifically opens the document in a review mode of the word processing program. The background UI-monitoring component 148 receives a notification when this triggering event occurs, accompanied by context information that describes the title 136 of the document that was opened. In another case, assume that the triggering event corresponds to an occurrence in which the user moves a cursor to a "To" field of a message being composed, such as an Email message. The background UI-monitoring component 148 receives a notification when this triggering event occurs, together with any salient context information regarding any text corpus associated with the Email message. For instance, the context information may describe the file name of a document attached to the Email, a subject line of the Email message, and so on. In another case, the triggering event corresponds to an occurrence in which the user accesses a contact lookup feature of the team communication component 118. The context information in this case may correspond to the name of the meeting being planned or in progress or the name of any document associated therewith.

More generally, a developer or the end user can choose a triggering event to be monitored that is indicative of a circumstance in which a user may be looking for communication participants, or may otherwise benefit from the contributions of the communication participants. Likewise, the developer or the end user can designate any piece of information that accompanies the triggering event as context information, insofar as this information summarizes the nature of the interaction to be set up or currently taking place. For example, the context information may correspond to the title (e.g., the file name) of a document directly or indirectly associated with the triggering event. Alternatively, or in addition, the context information may correspond to key terms associated with the triggering event, not necessarily in the title of the document.

The background UI-monitoring component 148 provides a scalable tool for monitoring applications because it leverages the externally-available UI content generated by these applications, and does not require internal access to the machine-readable instructions that implement the applications. For example, the background UI-monitoring component 148 can be easily adapted for use with a new Email application by observing the condition in which the UI-exposing service component 142 discovers and announces that the user has moved his or her cursor or touch to the "To" field of an Email being composed. The developer or end user can then register a triggering event that reflects this circumstance. The developer or end user does not require insight into the internal structure of the new Email application, such as the manner in which it passes signals among its internal software modules.

Upon receiving the context information, the background UI-monitoring component 148 sends a request to the graph service system 110. The request specifies at least the context information that has been received. In response, the graph service system 110 identifies one or more candidate participants (if any) that are assessed as being relevant to the context information, and notifies the background UI-monitoring component 148 of these candidate participant(s). The background UI-monitoring component 148, in turn, sends a signal to the user interaction component 150 that specifies the identified candidate participant(s).

The user interaction component 150 responds to the signal from the background UI-monitoring component 148 by generating a UI collaboration pane 152 that identifies the candidate participant(s). It then instructs the UI-generating service component 126 to present the UI collaboration pane 152 in a nonintrusive location on the UI presentation 106. In the non-limiting example of FIG. 1, the UI-generating service component 126 presents the UI collaboration pane 152 as a popup window in the right bottom corner of the UI presentation 106. More generally note that the UI collaboration pane 152 supplements the UI presentation 106 without drawing the user's attention away from performing whatever task is at hand. For instance, the UI collaboration pane 152 is presented on one part of the UI presentation 106, less than an entire display space associated with the UI presentation 106. Simultaneously therewith, the user can interact with one or more applications (such as a word processing program, Email application, etc.) using other parts of the UI presentation 106. The UI collaboration pane 152 does not obstruct these other parts, or at least does not entirely obstruct these other parts. Nor does interaction with the UI collaboration pane 152 require the user to close down or minimize these other applications.

In the non-limiting implementation of FIG. 1, the UI collaboration pane 152 includes a textual message that identifies two candidate participants that may be useful to add to a communication session being performed or that is about to be set up. The UI collaboration plane 152 also provides plural control elements (154, 156) that allow the user to invoke different communication modes. A call communication mode, which is invoked by clicking the first control element 154, is used to set up any type of synchronous (e.g., real time) communication call with the candidate participants. Examples of synchronous communication channels include real-time audio interaction, real-time video or hologram interaction, real-time avatar interaction in virtual space, and so on. A share communication mode, which is invoked upon clicking the second control element 156, is used to share aspects of a communication session in asynchronous fashion. In an example, "asynchronous" means that a real-time response is not required by the candidate participant(s). Additional information is provided below regarding the UI collaboration pane 152, with reference to FIG. 2.

In one example, the team communication component 118 is the agent that handles all modes of communication, e.g., by conducting a synchronous audio or video conference among plural participants, or conducting an asynchronous text-based chat session among the participants. The team communication component 118 can also automatically add recordings produced by the recording component(s) 146 as attachments to any synchronous or asynchronous communication session. This implementation of the computing system 102 has the advantage of giving the user an integrated and consistent user interface experience across all aspects of its service. In other cases, a user can configure the computing system 102 so that it chooses any combination of different communication platforms to handle different modes of communication.

The UI collaboration pane 152 disappears after the user interacts with it. The UI collaboration pane 152 also automatically disappears if the user does not interact with it for more than a predetermined amount of time. The background UI-monitoring component 148 continues in the background, waiting for notification by the UI-exposing service component 142 that the next triggering event is satisfied.

The graph service system 110 can identify the candidate participant(s) in various ways. Assume that the context information identifies the title 136 of the document opened in the review mode. The graph service system 110 can locate a title node (if any) in the graph that is associated with the document. The graph service system 110 then identifies the people-related nodes directly connected to the title node. These people-related nodes identify people associated with the document, such as the original author(s) of the document, the modifier(s) of the document, reviewers of the document, and so forth. In brief, these are people who have previously worked on the document in some manner. The graph service system 110 designates these individuals as direct collaborators to be invited to a communication session.

In addition, or alternatively, the graph service system 110 identifies one or more topic nodes (if any) that are directly linked to the title node. These topic nodes identify topics that are associated with the document under consideration. The graph service system 110 can identify these topics in an offline manner when the document is indexed. The graph service system 110 then identifies one or more people-related nodes that are linked to the topic nodes (if any). These are people who have been predetermined to have familiarity with the topic(s) under consideration. The graph service system 110 designates these individuals as indirect collaborators to be invited to the communication session.

The graph service system 110 can determine whether it is appropriate to associate a topic with a document based on plural factors, including any of: a number of times that a term associated with the topic appears in the document; a number of times that the term appears in a corpus of documents, of which the document is a member; a dictionary lookup operation; a score assigned by a machine-trained model, such as an entity-classification model, etc. Further, the graph service system 110 can assign a numeric value to a topic that represents the degree of its relevance to the document. The graph service system 110 can represent the value as a numeric score associated with an edge that connects a topic node to the title node. Alternatively, or in addition, the graph service system 110 can adjust the distance of the topic node from the title node to reflect the value; as the value increases (and the relevance increases), the distance between the topic node and the title node decreases. The graph service system 110 can likewise determine a person's affiliation with a topic under consideration based on plural factors, including any of: a number of times that the person has worked on a document pertaining to the topic; information provided in the person's online profile; self-reporting by the user regarding his or her expertise; a score assigned by a machine-trained model, etc. One commercial implementation of a graph is MICROSOFT GRAPH provided by MICROSOFT CORPORATION.

The graph service system 110 can form a final list of contributors from among the direct and indirect collaborators. The graph service system 110 can rank the entries in the list in any manner. For example, the graph service system 110 can assign the document author as a top (most relevant) entry in the list. The graph service system 110 can then add the other contributors to the list, in any order, or in order of their relative contributions to the document. The graph service system 110 can then add the indirect collaborators to the list. The graph service system 110 can rank the indirect collaborators based on the distances of their respective people-related nodes to the title node. More specifically, the graph service system 110 can assign a ranking score to any indirect collaborator based on the sum of relevance values of the edges that connect the indirect collaborator's node to the title node. A ranking score increases as the net distance from the collaborator's people-related node to the title node grows shorter. Note that the ranking operation is described above as being performed by the graph service system 110. Alternatively, or in addition, the ranking operation can be performed by the background UI-monitoring component 148, based on output results provided by the graph service system 110.

In other cases, the graph service system 110 cannot identify any candidate participants using the two-step process described above. In these cases, the graph service system 110 can be instructed to identify candidate participants based on other factors. For example, the graph service system 110 can be instructed to examine a history of collaboration between the current members of a communication session and other individuals who are not yet invited to the communication session. If someone has collaborated with the current group of collaborators on multiple prior occasions, this person is a good candidate to add to the list of candidate participants. More generally, the graph service system 110 can be instructed to identify the people-related nodes in the graph that are linked to the people-related nodes associated with the people who are currently conducting (or about to conduct) a communication session.

Alternatively, or in addition, the graph service system 110 can be instructed to mine textual evidence regarding the current context of the user's interaction with the UI presentation 106 that has not yet been processed and assimilated into the graph. For example, the graph service system 110 can be instructed to identify key terms in a message or document that is currently being created in real time. Because the message or document is new, its title and other attributes have not yet been assimilated into the graph in a prior backend indexing operation. Nevertheless, the graph service system 110 can use the textual evidence that is available to find relevant candidate participants, e.g., by finding topic nodes associated with key terms in the textual evidence, and then finding the people-related nodes associated with the topic nodes. Additional information regarding this alternative mode of operation will be set forth below at the end of Section A.

In yet another implementation, the collaboration managing system 108 can include a UI control feature (not shown) that allows a user to explicitly request suggestions for any text item (e.g., a document, text message, query, web page, etc.), independent of any notifications received from the UI-exposing service component 142. For example, the user can create a document and then activate the UI control feature to request suggestions. Or the user can download a document from a remote source that has not yet been indexed by the graph service system 110 and then activate the UI control feature to request suggestions. The graph service system 110 can respond by indexing the text item and then generating suggestions in the manner described above. Or the graph service system 110 can extract key terms from the text item, identify any topic nodes in the graph associated with the key terms, and identify any people-related nodes associated with these topic nodes. In other cases, the user can activate the UI control feature to ask for suggestions for a document that has already been indexed by the graph search system 110, e.g., without waiting for a notification by the UI-exposing service component 142.

Figure 2:
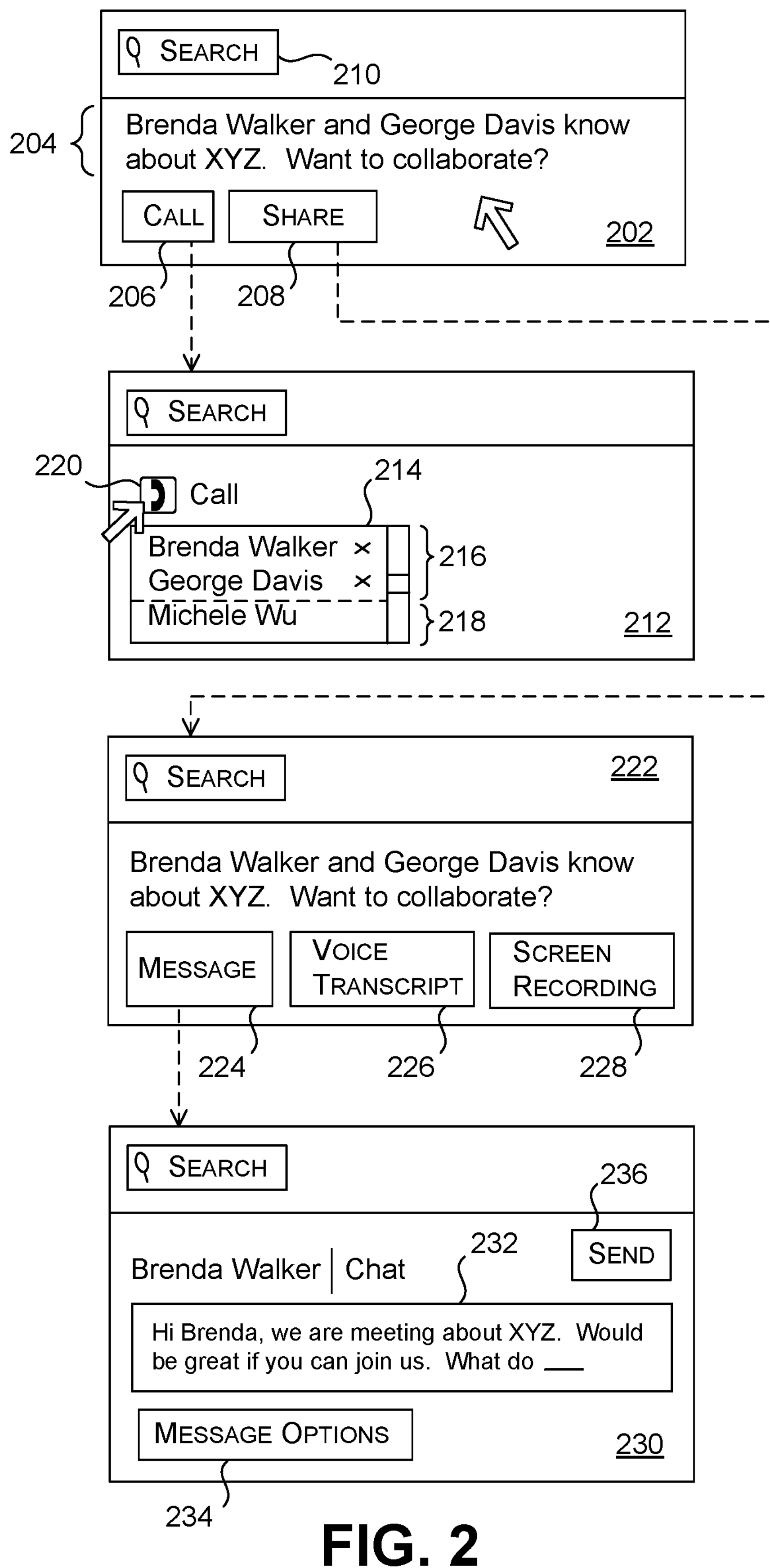
FIG. 2 shows an illustrative series of UI collaboration panes that allow a user to set up communication with participants with minimal user interaction.

FIG. 2 shows an illustrative sequence of UI collaboration panes that the user interaction component 150 can present to the user. The user interaction component 150 presents a first UI collaboration pane 202 upon the occurrence of a triggering condition, such as when the user opens a document in the review mode. Assume that the document has a title "XYZ," corresponding to its file name. Further assume that the collaboration-managing system 108 has determined that hypothetical individuals "Brenda Walker" and "George Davis" are potential direct collaborators, while "Michele Wu" is an indirect collaborator. For example, Michele Wu may be associated with a topic, which, in turn, is associated with the document. But Michele Wu did not directly contribute to the creation or modification of the document. The UI collaboration pane 202 presents a message 204 that informs the user that Brenda Walker and George Davis know something about the document under consideration. The UI collaboration pane 202 includes a call control element 206 for establishing synchronous communication with the either or both of the candidate participants. The UI collaboration pane 202 includes a share control element 208 for establishing asynchronous communication with either or both of the candidate participants. Optionally, the UI collaboration pane 202 includes a search control 210 that enables a user to perform a search of a database of communication participants. This permits the user to identify and add a participant to a communication session, independent of the automatically-generated suggestions of the collaboration-managing system 108.

The user interaction component 150 presents a second UI collaboration pane 212 when the user clicks the call control element 206 in the first UI collaboration pane 202. The second UI collaboration pane 212 includes a UI element 214 that shows a list of the candidate participants identified by the graph service system 110. A first subset 216 of the candidate participants correspond to the direct collaborators, and a second subset 218 of the candidate participants correspond to the indirect collaborators. In some implementations, the user interaction component 150 automatically selects the direct collaborators, but treats the indirect collaborators as optional attendees. The user may interact with the UI element 214 to selects the name "Michele Wu" to formally add this indirect collaborator to the list of invitees to the communication session.

The user can initiate synchronous communication by pressing a call control element 220. Assume that the computing system 102 is configured to use the team communication component 118 to perform asynchronous communication. In this case, actuation of the call control element 220 prompts the team communication component 118 to make calls to the selected candidate participants. Each candidate participant who accepts the invitation will be added to an ongoing communication session, or to a new communication session (if there is no ongoing communication session). The computing system 102 can be configured to alternatively use other communication mechanisms to establish synchronous communication, such as a traditional telephone call.

The user interaction component 150 alternatively presents a third UI collaboration pane 222 when the user activates the share control element 208 in the first UI collaboration pane 202. The third collaboration pane 222 reveals three control elements (224, 226, 228) for invoking three different asynchronous communication modes. More specifically, the user activates a message control element 224 to send a text message to the candidate participants. The user activates a voice transcript control element 226 to commence a voice recording, which, when complete, is sent to the candidate participants via an attachment to a text message or other type of message. The user activates a screen recording control element 228 to invoke a screen capture recording, which, when complete, is sent to the candidate participants as a video file attached to a text message or other type of message. These three asynchronous communication options are to be interpreted as illustrative and not limiting; other implementations of the user interaction component 150 can rely on additional asynchronous communication options and/or can omit one or more of the three options described above.

The user interaction component 150 generates a fourth UI collaboration pane 230 when the user opts to send a text message to one of the candidate participants ("Brenda Walker"). The fourth UI collaboration pane 230 includes: a text entry field 232 in which the user can type a text message; one or more message option control elements 234 for formatting the text message, adding supplemental content to the text message (e.g., emoji's, attachments, etc.), etc.; and a send control element 236 for sending the text message to the candidate participant. More specifically, in one implementation, the user interaction component 150 automatically populates the fourth UI collaboration pane 230 with the names of Brenda Walker and George Davis upon the user's activation of the message control element 224 in the third UI collaboration pane 222. The text message, to be sent, is also automatically populated with the addresses of Brenda Walker and George Davis. In this particular example, the user has subsequently chosen to remove George Davis from list of recipients of the text message. Upon activating the send control entry 236, a message-sending component (not shown) provided by the team communication component 118 (or some other communication component) will send the text message to the address of Brenda Walker.

Although not shown in FIG. 2, a voice recording component commences a voice recording when the user activates the voice transcript control element 226. This recording ends when a user issues a stop command, which then prompts the user interaction component 150 to automatically add the recording as an attachment to a text message or other type of message. A screen capture recording component commences a screen capture recording when the user activates the screen recording control element 228. Again, this recording ends when a user issues a stop command, which then prompts the user interaction component 150 to automatically add the recording as an attachment to a text message or other type of message.

In whole, FIG. 2 demonstrates that a user can add new participants to a communication session with a small number of clicks. For example, consider the first two UI collaboration panes (202, 212). The collaboration-managing system 108 automatically generates the first UI collaboration pane 202 when the user opens the document in the review mode. The user can add the identified recipients to a communication session in just two clicks, that is, a first click to select the call control element 206 in the first UI collaboration pane 202 and a second click to select the call control element 220 in the second UI collaboration pane 212. In addition to simplifying the user interface actions required by the user, the computing system 102 reduces the amount of computing resources (e.g., processor resources, power consumption, etc.) required by the input operations. This is because a reduction in the number of input actions leads to a commensurate reduction in the amount of computing resources that are required to process the input actions.

The advantage of the computing system 102 can be appreciated by contrasting it with a manual mode of adding participants to a conversation. In the manual approach, it is first incumbent on the user to recall that Brenda Walker and George Davis are appropriate participants to add to the conversation. The user may then need to activate a contact program to find the addresses of these two participants. The user may then need to interact with the team communication component 118 to activate the control element by which new participants are added to a conversation. The user may then need to type in the addresses of the participants or otherwise select their addresses. The user may then activate a send command. Even in the most favorable scenario, this traditional sequence of actions includes more than two clicks. Further the above-summarized traditional actions draw the user's attention away from whatever task is immediately at hand, such as interacting with the existing members of the communication session. The computing system 102 overcomes both of these drawbacks by greatly simplifying the number of user interface actions required to add new participants to a conversation, while not distracting the user from a task at hand.

Figure 3:
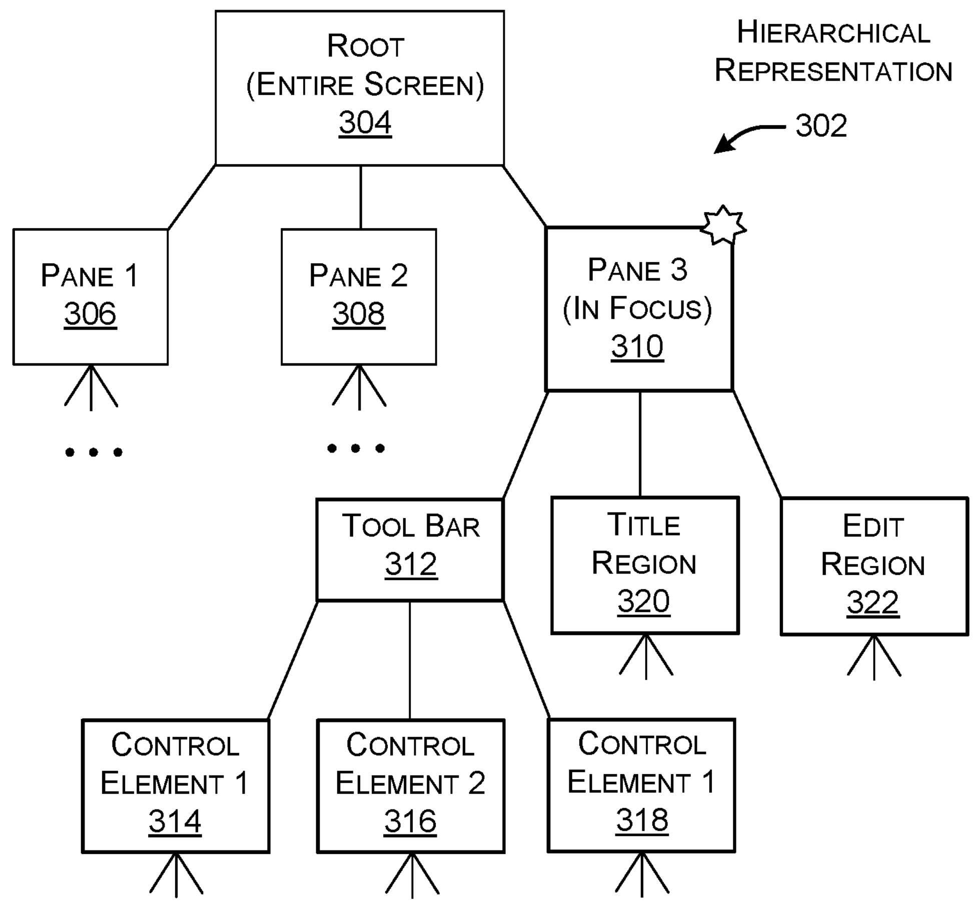
FIG. 3 shows an illustrative representation of a UI presentation as a hierarchical organization of UI features. A UI-exposing component, which is a part of the computing system of FIG. 1, generates the representation.

FIG. 3 shows a simplified hierarchical representation 302 of the simplified UI presentation shown in FIG. 1. The hierarchical representation 302 includes a root node 304 that represents the entirety of the UI presentation 106, and three window nodes (306, 308, 310) that represent the three active windows in the UI presentation 106. The third window node 310 represents the window 128 that is receiving the current focus of the user. The in-focus status of the third window node 310 can be designated using an attribute associated with the node 310, represented in FIG. 3 with a star symbol. A tool bar node 312 represents a tool bar that appears in the UI presentation 106, and control element nodes (314, 316, 318) represent individual control elements in the tool bar. A title region node 320 represents a field that displays the title 136 of the document, and an edit region node 322 represents the body of the document.

The UI-exposing service component 142 can establish the hierarchical representation 302 shown in FIG. 3 when the document is initially opened. Assume that the in-focus window 128 (of FIG. 1) is presented by a word processing program in response to the user opening a document. The UI-exposing service component 142 can determine the hierarchical organization of control elements in the UI presentation 106 based on various factors, including: the organization of machine-readable instructions that implement the word processing program; cues added to the machine-readable instructions by its developer(s); the structure of the document itself.

Figure 4:
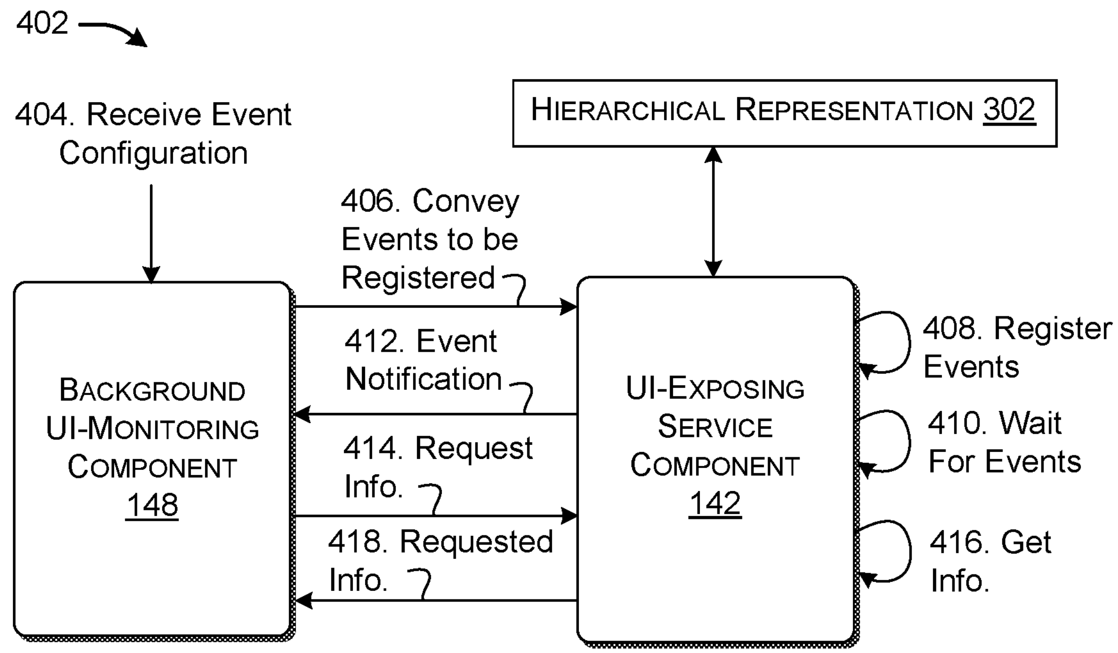
FIG. 4 shows illustrative interaction between a background UI-monitoring component and a UI-exposing service component, which are additional parts of the computing system of FIG. 1.

FIG. 4 shows illustrative interactions 402 between the background UI-monitoring component 148 and the UI-exposing service component 142. In operation 404, the background UI-monitoring component 148 receives event configuration information from a developer or end user or some other entity. The event configuration information identifies: (a) the nature of the occurrence that is associated with each triggering event to be monitored; and (b) the type of context information that is to be collected from the UI-exposing service component 142 when each triggering event occurs. In operation 406, the background UI-monitoring component 148 forwards information regarding the triggering events to be monitored to the UI-exposing service component 142. In operation 408, the UI-exposing service component 142 stores information in the data store 144 (not shown in FIG. 4) that identifies the triggering events to be monitored. In operation 410, the UI-exposing service component 142 waits for the occurrence of a UI action that matches a triggering event.

When a triggering event occurs, in operation 412, the UI-exposing service component 142 sends a message to the background UI-monitoring component 148. Upon receipt of this notification, in operation 414, the background UI-monitoring component 148 sends a message to the UI-exposing service component 142, requesting it to supply the predetermined context information associated with the triggering event that has occurred. For example, if the triggering event is the opening of a document, the background UI-monitoring component 148 asks the UI-exposing service component to extract and return the title of the document. The background UI-monitoring component 148 consults the configuration information entered in operation 404 to determine what type of context information to request from the UI-exposing service component 142. In operation 416, the UI-exposing service component 142 extracts the requested context information from the hierarchical representation 302. In operation 418, the UI-exposing service component 142 sends the requested context information to the background UI-monitoring component 148.

Figure 5:
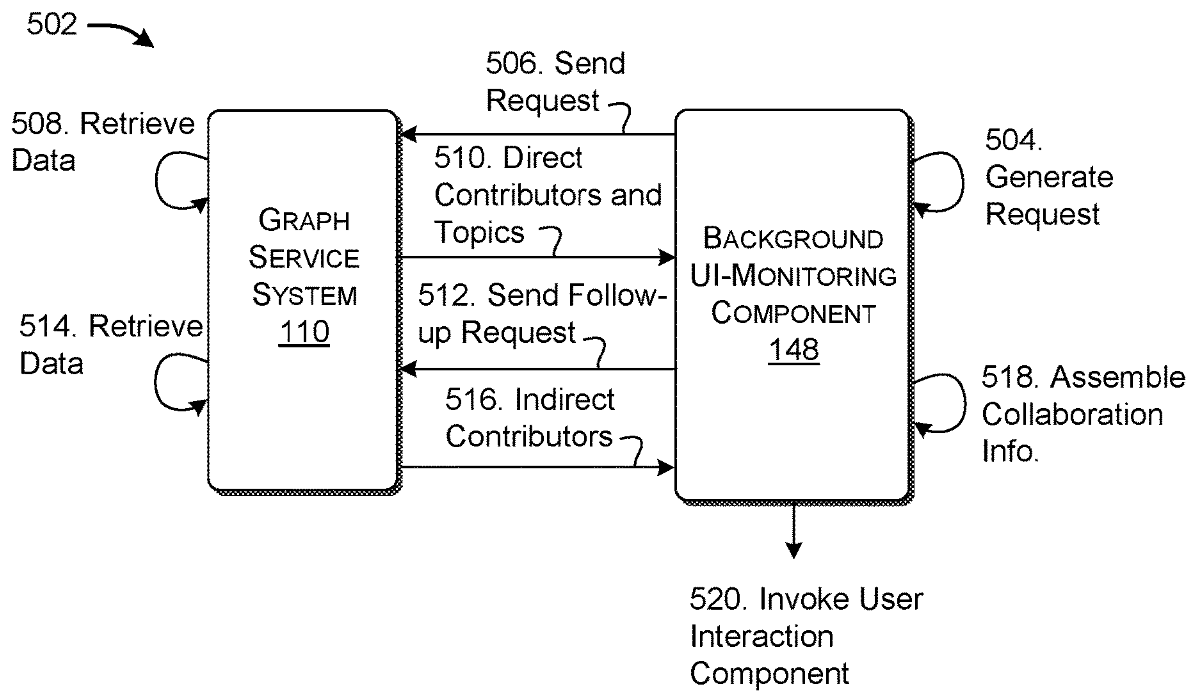
FIG. 5 shows illustrative interaction between the background UI-monitoring component and a graph service system. The graph service system is another part of the computing system of FIG. 1.

FIG. 5 shows illustrative interactions 502 between the background UI-monitoring component 148 and the graph service system 110. In operation 504, the background UI-monitoring component 148 generates a request for candidate participants based on the context information it has received from the UI-exposing service component 142 (per the protocol of FIG. 4). In operation 506, the background UI-monitoring component 148 sends the request to the graph service system 110. In operation 508, the graph service system 110 identifies a starting or home node associated with the context information, such as a title node associated with a document that the user has opened in the review mode. The graph service system 110 then identifies all the people-related nodes and topic nodes that are directly linked to the starting node. In operation 510, the graph service system 110 sends information regarding the identified people-related nodes and the topic nodes to the background UI-monitoring component 148. The people-related nodes identify people who had a role in creating or editing the document. These people are designated as direct collaborators.

In operation 512, the background UI-monitoring component 148 optionally sends one more follow-up requests to the graph service system 110. For example, the background UI-monitoring component 148 can ask the graph service system 110 to find the people-related nodes that are linked to the identified topic nodes. These people-related nodes correspond to potential indirect collaborators who did not play a role in creating the document, but nonetheless have knowledge regarding the topic(s) discussed in the document. In operation 514, the graph service system 110 identifies the people-related nodes linked to the topic nodes. In operation 516, the graph service system 110 sends information regarding the people it has discovered to the background UI-monitoring component 148. In operation 518, the background UI-monitoring component 148 generates the UI collaboration pane 152 based on the information that has been collected from the graph service system 110. In operation 520, the background UI-monitoring component 148 instructs the UI-generating service component 126 to display the UI collaboration pane 152. Note that, in an example, any information that the graph service system 110 sends to the background UI-monitoring component 148 is referred to herein as collaboration information. The collaboration information directly or indirectly identifies candidate participants to be added to a communication session.

The protocols set forth in FIGS. 4 and 5 can be varied in any manner. To provide one example, in FIG. 5, the background UI-monitoring component 148 can send a single request to the graph service system 110 that asks it to identify both the direct and indirect collaborators, and to forward information regarding all candidate participants at the same time. In FIG. 4, the background UI-monitoring component 148 can use the initial message 406 to alert the UI-exposing service component 142 to both the triggering events to be monitored and the type of context information to be collected upon the occurrence of each triggering event.

Figure 6:
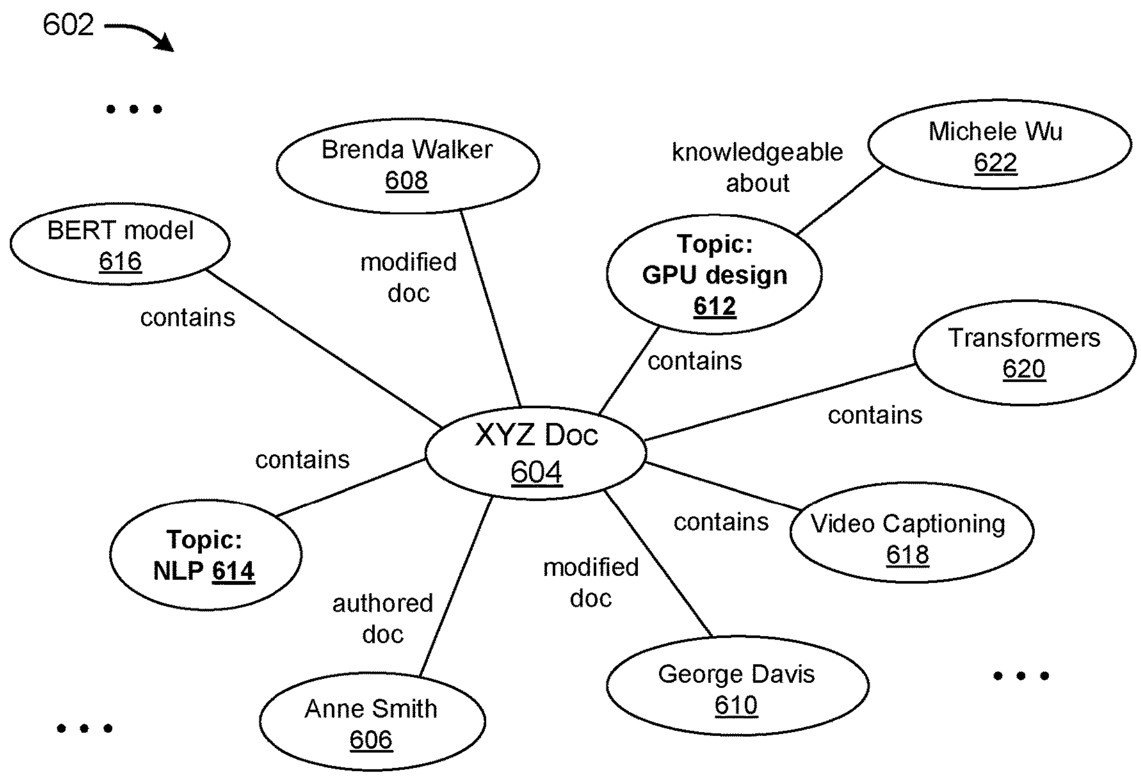
FIG. 6 shows a small representative portion of a graph available to the graph service system.

FIG. 6 shows a small portion of a simplified graph 602 that is accessible to the graph service system 110. The graph 602 in its entirety can potentially include thousands, millions, etc. of nodes associated with different entities. In some cases, each community in which interaction occurs can use a graph that describes documents, events, people, etc. associated with that particular community. For example, the community may correspond to the employees of a company, or the staff associated with a university, etc. This scoping of graph content ensures the privacy of the information stored in the graph, and reduces the chances that the computing system 102 will suggest unauthorized or otherwise inappropriate individuals be added to a communication session.

An edge or link between any two nodes in the graph 602 is annotated with information that specifies the nature of the relationships between the two nodes. The edge can also be annotated with a value that conveys the strength of the relationship between the two nodes. The graph service system 110 can optionally adjust the distance between the two nodes to reflect the strength of the relationship. An edge that is shorter than another edge reflects a stronger relationship among two nodes.

The simplified graph 602 shown in FIG. 6 includes a title node 604 associated with a document title, e.g., corresponding to a document the user has opened in the review mode. The graph 602 includes a people-related node 606 that identifies the author of the document, and two people-related nodes (608, 610) that identify people who had a role in modifying the document. As noted, these three people correspond to direct collaborators.

Topic nodes (612, 614) identify topics that the graph service system 110 has determined, in advance, to be relevant to the document. Other term nodes (616, 618, 620) identify key terms contained in or otherwise pertinent to the document, that may not rise to the level of topics. A people-related node 622 is associated with the topic node 612, indicating that this person (i.e., "Michele Wu") knows something about the topic associated with the topic node 612 (i.e., "GUI design").

The above computing system 102 can be varied in any number of ways. A non-inclusive list of illustrative variations are set forth below. Further note that the variations do not mutually exclude each other. That is, an implementation of the computing system 102 can combine any number of the variations together. Further, any variation can be combined with the implementation described above with reference to FIG. 1.

First variation. In the examples described above, the UI-exposing service component 142 detects when a triggering event has occurred by detecting changes in the hierarchical representation of the UI presentation 106. Alternatively, or in addition, the UI-exposing service component 142 can rely on other logic to detect when a triggering event has occurred. For example, the UI-exposing service component 142 can use intent-detection logic to determine when text input by the user is indicative of a circumstance in which a discussion may benefit from the contribution of other participants. Such a function be can be implemented using any kind of rules-based system that detects predetermined keywords in the user's text. Alternatively, or in addition, such a function can be implemented using any kind of machine-trained model, such as a SVM (Support Vector Machine model), any type of deep neural network model such as a transformer-based model, a logistic regression model, and so forth.

Second variation. Instead of using the hierarchical representation 302 of the UI presentation 106, or in addition to using the hierarchical representation 302, the UI-exposing service component 142 can produce an image of the UI presentation 106, and then perform image analysis on the image to determine whether a triggering event has occurred. The UI-exposing service component 142 can use any machine-trained model to perform this task, such as a convolutional neural network, a transformer-based model, etc.

Third variation. Instead of using the hierarchical representation 302 of the UI presentation 106, or in addition to using the hierarchical representation 302, the UI-exposing service component 142 can detect a triggering event based on signals produced by the program components 116 that contribute to the UI presentation 106. For example, the UI-exposing service component 142 can intercept a signal produced by a word processing program that indicates that the user has opened a document in the review mode.

Fourth variation. Alternatively, or in addition, the UI-exposing service component 142 can use more complex rules to determine when a triggering event has occurred. For example, the UI-exposing service component 142 can rely on a rule that specifies that a triggering event occurs when two prescribed subevents have occurred in the UI presentation 106, or one kind of event has occurred without the occurrence of another kind of event, etc. Such a rule can be expressed in an IF-THEN format, e.g., using a Boolean combination of subevents.

Fifth variation. The graph service system 110 described above identifies candidate participants by identifying people-related nodes in the graph 602 that are linked to a title node 604 associated with a document under consideration. Alternatively, or in addition, the graph service system 110 can perform its search using other strategies, such as by choosing another type of starting node (that is, other than the title node 604). For example, graph service system 110 can use the people-related nodes associated with the people who contributed to the creation of the document as seeds in performing its search.

Sixth variation. The above explanation of the graph service system 110 presupposed that the graph service system 110 has already seen and indexed a document under consideration. In other cases, the graph service system 110 can identify candidate participants based on documents or other textual evidence that has not yet been processed and integrated into the graph 602. For example, the graph service system 110 can receive one or more terms of text content that a user is currently creating, and which has not yet been indexed by the graph service system 110. The graph service system 110 can identify topic nodes associated with the terms. The graph service system 110 can then identify the people-related nodes associated with those topic nodes. The graph service system 110 identifies the people associated with the people-related nodes as potential indirect collaborators. Alternatively, the graph service system 110 can index a new document prior to identifying collaborators.

B. Illustrative Processes

FIGS. 7-12 show processes that explain the operation of the collaboration-managing system 108 of Section A in flowchart form. Since the principles underlying the operation of the collaboration-managing system 108 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

FIGS. 7 and 8 together show a first process 702 for facilitating interaction among communication participants. In block 704 of FIG. 7, the collaboration-managing system 108 instructs a user interface (UI)-exposing service (e.g., the UI-exposing service component 142) to monitor occurrence of one or more triggering events. In block 706 of FIG. 7, the collaboration-managing system 108 receives an indication from the UI-exposing service that a particular triggering event, of the one or more triggering events, has occurred in response to interaction by a user with a UI presentation 106 in a predetermined manner. In block 708 of FIG. 7, the collaboration-managing system 108 receives context information from the UI-exposing service that describes a current context associated with the particular triggering event. In block 710 of FIG. 7, the collaboration-managing system 108 generates a request based on the context information, and sends the request to a graph service (e.g., the graph service system 110), the graph service having access to a graph 602 that specifies relationships among a plurality of nodes. In block 712 of FIG. 7, the collaboration-managing system 108 receives collaboration information from the graph service, the graph service producing the collaboration information by interacting with the graph 602 in response to the request, the collaboration information identifying one or more candidate participants who are relevant to the current context.

In block 802 of FIG. 8, the collaboration-managing system 108 generates a UI collaboration pane 152 that identifies the one or more candidate participants, the UI collaboration pane 152 providing access to plural communication modes for interacting with the one or more candidate participants. In block 804 of FIG. 8, the collaboration-managing system 108 requests a UI-generating service (e.g., the UI-generating service component 126) to display the UI collaboration pane 152 on one part of the UI presentation 106, another part of the UI presentation 106 that does not display the UI collaboration pane 152 simultaneously presenting an interface through which the user interacts with at least one application (such as the team communication component 118).

FIGS. 9 and 10 together show a second process 902 for facilitating interaction among communication participants. In block 904 of FIG. 9, the collaboration-managing system 108 receives context information from a user interface (UI)-exposing service (e.g., the UI-exposing service component 142) that describes a current context associated with a particular triggering event that has occurred, the particular triggering event involving interaction by a user with a document on a UI presentation 106 in a specified manner. In block 906 of FIG. 9, the collaboration-managing system 108 generates a request based on the context information, and sends the request to a graph service (e.g., the graph service system 110), the graph service having access to a graph 602 that specifies relationships among a plurality of nodes.

In block 1002 of FIG. 10, the collaboration-managing system 108 receives collaboration information from the graph service, the graph service producing the collaboration information by interacting with the graph 602 in response to the request, the collaboration information identifying one or more candidate participants who are relevant to the current context, each of the one or more candidate participants having a corresponding people-related node in the graph 602 that is directly or indirectly linked to a title node 604 associated with a title 136 of the document. In block 1004 of FIG. 10, the collaboration-managing system 108 generates a UI collaboration pane 152 that identifies the one or more candidate participants, the UI collaboration pane 152 also identifying plural communication modes for interacting with the one or more candidate participants. In block 1006 of FIG. 10, the collaboration-managing system 108 requests a UI-generating service (e.g., the UI-generating service component 126) to display the UI collaboration pane 152 on one part of the UI presentation 106.

FIGS. 11 and 12 together show a third process 1102 for facilitating interaction among communication participants. In block 1104 of FIG. 11, the collaboration-managing system 108 receives context information from a user interface (UI)-exposing service (e.g., the UI-exposing service component 142) that describes a current context associated with a particular triggering event that has occurred. In block 1106 of FIG. 11, the collaboration-managing system 108 generates a request based on the context information, and sends the request to a graph service (e.g., the graph service system 110), the graph service having access to a graph 602 that specifies relationships among a plurality of nodes.

In block 1202 of FIG. 12, the collaboration-managing system 108 receives collaboration information from the graph service, the graph service producing the collaboration information by interacting with the graph 602 in response to the request, the collaboration information identifying one or more candidate participants who are relevant to the current context. In block 1204 of FIG. 12, the collaboration-managing system 108 generates a UI collaboration pane 152 that identifies the one or more candidate participants, the UI collaboration pane 152 also identifying plural communication modes for interacting with the one or more candidate participants. In block 1206 of FIG. 12, the collaboration-managing system 108 requests a UI-generating service (e.g., the UI-generating service component 126) to display the UI collaboration pane on the UI presentation 106. A particular communication mode among the plurality of communication modes allows the user to add a particular candidate participant, of the one or more candidate participants, to a synchronous communication session, wherein activation of the particular communication mode will invoke a call to the particular candidate participant. Another particular communication mode among the plurality of communication modes allows the user to generate a recording of the communication session or to generate a text message, and then to send the recording or text message to the particular candidate participant.

C. Representative Computing Functionality

FIG. 13 shows an example of computing equipment that can be used to implement any of the systems summarized above. The computing equipment includes a set of user computing devices 1302 coupled to a set of servers 1304 via a computer network 1306. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1306 can be implemented as a local area network, a wide area network (e.g., the Internet), one or more point-to-point links, or any combination thereof.

FIG. 13 also indicates that the program execution system 104, the collaboration-managing system 108, and the graph service system 110 can be spread across the user computing devices 1302 and/or the servers 1304 in any manner. For instance, in one case, the program execution system 104 and the collaboration-managing system 108 are entirely implemented by in local fashion by each individual user computing device, while the graph service system 110 is entirely implemented by the servers 1304. In another case, the functionality associated with at least one of these three elements is distributed between the servers 1304 and each user computing device in any manner.

Figure 14:
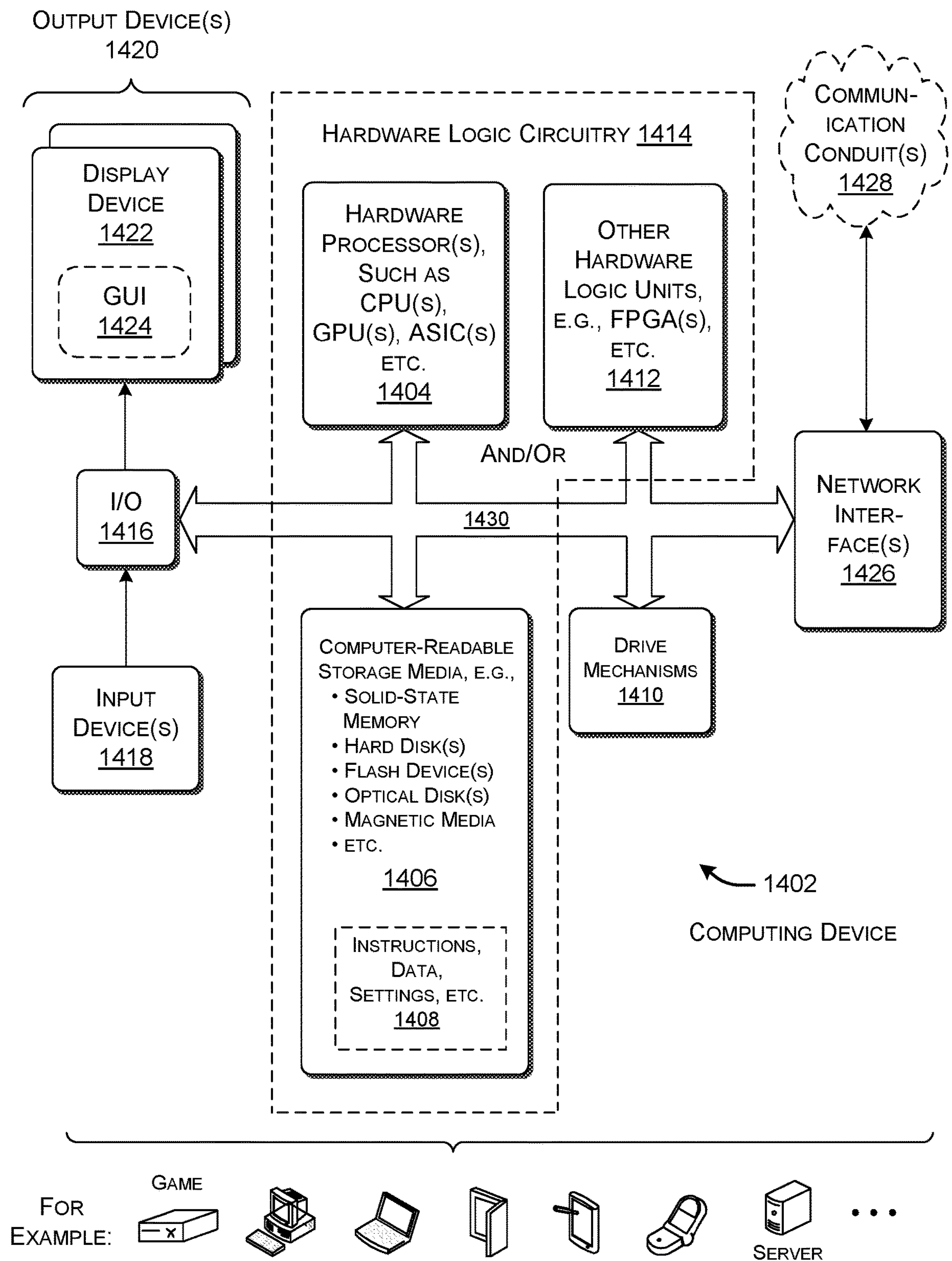
FIG. 14 shows an illustrative type of computing device that can be used to implement any aspect of the features shown in the foregoing drawings.

FIG. 14 shows a computing device 1402 that can be used to implement any aspect of the mechanisms set forth in the above-described figures. For instance, the type of computing device 1402 shown in FIG. 14 can be used to implement any user computing device or any server shown in FIG. 13. In all cases, the computing device 1402 represents a physical and tangible processing mechanism.

The computing device 1402 can include one or more hardware processors 1404. The hardware processor(s) 1404 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing device 1402 can also include computer-readable storage media 1406, corresponding to one or more computer-readable media hardware units. The computer-readable storage media 1406 retains any kind of information 1408, such as machine-readable instructions, settings, data, etc. Without limitation, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable unit of the computing device 1402. Further, any instance of the computer-readable storage media 1406 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing device 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing device 1402, and/or a hardware storage unit (such as a hard disk) for retaining/archiving information on a more permanent basis. In the latter case, the computing device 1402 also includes one or more drive mechanisms 1410 (such as a hard drive mechanism) for storing and retrieving information from an instance of the computer-readable storage media 1406.

The computing device 1402 may perform any of the functions described above when the hardware processor(s) 1404 carry out computer-readable instructions stored in any instance of the computer-readable storage media 1406. For instance, the computing device 1402 may carry out computer-readable instructions to perform each block of the processes described in Section B.

Alternatively, or in addition, the computing device 1402 may rely on one or more other hardware logic units 1412 to perform operations using a task-specific collection of logic gates. For instance, the hardware logic unit(s) 1412 may include a fixed configuration of hardware logic gates, e.g., that are created and set at the time of manufacture, and thereafter unalterable. Alternatively, or in addition, the other hardware logic unit(s) 1412 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1414 includes any combination of the hardware processor(s) 1404, the computer-readable storage media 1406, and/or the other hardware logic unit(s) 1412. That is, the computing device 1402 can employ any combination of the hardware processor(s) 1404 that execute machine-readable instructions provided in the computer-readable storage media 1406, and/or one or more other hardware logic unit(s) 1412 that perform operations using a fixed and/or programmable collection of hardware logic gates. More generally stated, the hardware logic circuitry 1414 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1414 that performs a particular function or combination of functions.

In some cases (e.g., in the case in which the computing device 1402 represents a user computing device), the computing device 1402 also includes an input/output interface 1416 for receiving various inputs (via input devices 1418), and for providing various outputs (via output devices 1420). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1422 and an associated graphical user interface presentation (GUI) 1424. The display device 1422 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1402 can also include one or more network interfaces 1426 for exchanging data with other devices via one or more communication conduits 1428. One or more communication buses 1430 communicatively couple the above-described units together.

The communication conduit(s) 1428 can be implemented in any manner, e.g., by a local area computer network, a wide area computer network (e.g., the Internet), point-to-point connections, etc., or any combination thereof. The communication conduit(s) 1428 can include any combination of hardwired links, wireless links, routers, gateway functionality, name servers, etc., governed by any protocol or combination of protocols.

FIG. 14 shows the computing device 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing device 1402 can include a hardware logic unit that integrates the functions of two or more of the units shown in FIG. 1. For instance, the computing device 1402 can include a system on a chip (SoC or SOC), corresponding to an integrated circuit that combines the functions of two or more of the units shown in FIG. 14.

The following summary provides a non-exhaustive set of illustrative examples of the technology set forth herein.

(A1) According to a first aspect, some implementations of the technology described herein include a method (e.g., the process 702), executed by a computing system (e.g., the computing system 102), for facilitating interaction among communication participants. The method includes instructing (e.g., in block 704) a user interface (UI)-exposing service (e.g., the UI-exposing service component 142) to monitor occurrence of one or more triggering events. The method further includes receiving (e.g., in block 706) an indication from the UI-exposing service that a particular triggering event, of the one or more triggering events, has occurred in response to interaction by a user with a UI presentation (e.g., the UI presentation 106) in a predetermined manner. The method further includes receiving (e.g., in block 708), context information from the UI-exposing service that describes a current context associated with the particular triggering event. The method further includes generating (e.g., in block 710) a request based on the context information, and sending the request to a graph service (e.g., the graph service system 110), the graph service having access to a graph 602 that specifies relationships among a plurality of nodes. The method further includes receiving (e.g., in block 712) collaboration information from the graph service, the graph service producing the collaboration information by interacting with the graph in response to the request, the collaboration information identifying one or more candidate participants who are relevant to the current context.

The method further includes generating (e.g., in block 802 of FIG. 8) a UI collaboration pane (e.g., the UI collaboration pane 152) that identifies the one or more candidate participants, the UI collaboration pane providing access to plural communication modes for interacting with the one or more candidate participants. The method further includes requesting (e.g., in block 804) a UI-generating service (e.g., the UI-generating service component 126) to display the UI collaboration pane on one part of the UI presentation, another part of the UI presentation that does not display the UI collaboration pane simultaneously presenting an interface through which the user interacts with at least one application.

(A2) According some implementations of the method of A1, the particular triggering event involves opening a document.

(A3) According some implementations of the method of A1, the particular triggering event involves interaction with the UI presentation to contact a communication participant.

(A4) According some implementations of the method of A1, the particular triggering event involves interaction with a specified field of a message being composed that is presented on the UI presentation.

(A5) According some implementations of any of the methods of A1-A4, the UI-exposing service represents the UI presentation as a hierarchical collection of UI features presented on the UI presentation.

(A6) According some implementations of any of the methods of A1-A5, the UI presentation shows a document with which the user is currently interacting, and wherein the context information returned by the UI-exposing service specifies a document title associated with the document.

(A7) According some implementations of the method of A6, the collaboration information received from the graph service specifies one or more direct collaborators, the graph service identifying the one or more direct collaborators in response to discovering one or more respective people-related nodes that are associated with the one or more direct collaborators and that are directly connected to a title node associated with the document title.

(A8) According some implementations of the method of A7, the collaboration information received from the graph service also specifies at least one indirect collaborator, the graph service identifying the indirect collaborator in response to discovering a respective people-related node that is associated with the indirect collaborator and that is connected to a topic node, wherein the topic node is directly connected to the title node associated with the document title.

(A9) According some implementations of any of the methods of A1-A8, a particular communication mode among the plurality of communication modes allows the user to add a particular candidate participant, of the one or more candidate participants, to a synchronous communication session, wherein activation of the particular communication mode in the UI collaboration pane will invoke a call to the particular candidate participant.

(A10) According some implementations of any of the methods of A1-A8, a particular communication mode among the plurality of communication modes allows the user to send a text message to a particular candidate participant, of the one or more candidate participants, wherein activation of the particular communication mode will cause a text message to be automatically populated with an identifier of the particular candidate participant.

(A11) According some implementations of any of the methods of A1-A8, a particular communication mode among the plurality of communication modes allows the user to send a voice recording to a particular candidate participant, of the one or more candidate participants, wherein activation of the particular communication mode will cause the voice recording to commence.

(A12) According some implementations of any of the methods of A1-A8, a particular communication mode among the plurality of communication modes allows the user to send a screen capture recording to a particular candidate participant, of the one or more candidate participants, wherein activation of the particular communication mode will cause the screen capture recording to commence.

(B1) A second aspect of the technology includes another method (e.g., the process 902), executed by a computing system (e.g., the computing system 102), for facilitating interaction among communication participants. The method includes receiving (e.g., in block 904 of FIG. 9) context information from a user interface (UI)-exposing service (e.g., the UI-exposing service component 142) that describes a current context associated with a particular triggering event that has occurred, the particular triggering event involving interaction by a user with a document on a UI presentation (e.g., the UI presentation 106) in a specified manner. The method further includes generating (e.g., in block 906) a request based on the context information, and sending the request to a graph service (e.g., the graph service system 110), the graph service having access to a graph (e.g., the graph 602) that specifies relationships among a plurality of nodes.

The method further includes receiving (e.g., in block 1002 of FIG. 10) collaboration information from the graph service, the graph service producing the collaboration information by interacting with the graph in response to the request, the collaboration information identifying one or more candidate participants who are relevant to the current context, each of the one or more candidate participants having a corresponding people-related node in the graph that is directly or indirectly linked to a title node (e.g., the title node 604) that is associated with a title (e.g., the title 136) of the document. The method further includes generating (e.g., in block 1004) a UI collaboration pane (e.g., the UI collaboration pane 152) that identifies the one or more candidate participants, the UI collaboration pane also identifying plural communication modes for interacting with the one or more candidate participants. The method further includes requesting (e.g., in block 1006) a UI-generating service (e.g., the UI-generating service component 126) to display the UI collaboration pane on a part of the UI presentation.

(C1) A third aspect of the technology includes another method (e.g., the process 1102), executed by a computing system (e.g., the computing system 102), for facilitating interaction among communication participants. The method includes receiving (e.g., in block 1104 of FIG. 11) context information from a user interface (UI)-exposing service (e.g., the UI-exposing service component 142) that describes a current context associated with a particular triggering event that has occurred. The method further includes generating (e.g., in block 1106) a request based on the context information, and sending the request to a graph service (e.g., the graph service system 110), the graph service having access to a graph (e.g., the graph 602) that specifies relationships among a plurality of nodes.

The method further includes receiving (e.g., in block 1202 of FIG. 12) collaboration information from the graph service, the graph service producing the collaboration information by interacting with the graph in response to the request, the collaboration information identifying one or more candidate participants who are relevant to the current context. The method further includes generating (e.g., in block 1204) a UI collaboration pane (e.g., the UI collaboration pane 152) that identifies the one or more candidate participants. The UI collaboration pane also identifies plural communication modes for interacting with the one or more candidate participants. The method further includes requesting (e.g., in block 1206) a UI-generating service (e.g., the UI-generating service component 126) to display the UI collaboration pane on the UI presentation. A particular communication mode among the plurality of communication modes allows the user to add a particular candidate participant, of the one or more candidate participants, to a synchronous communication session, wherein activation of the particular communication mode will invoke a call to the particular candidate participant. Another particular communication mode among the plurality of communication modes allows the user to generate a recording of the communication session or to generate a text message, and then to send the recording or text message to the particular candidate participant.

In yet another aspect, some implementations of the technology described herein include a computing system (e.g., computing system 102) for facilitating interaction among communication participants. The computing system includes hardware logic circuitry (e.g., the hardware logic circuitry 1414) that is configured to perform any of the methods described herein (e.g., any of the methods A1-12, B1, or C1).

In yet another aspect, some implementations of the technology described herein include a computer-readable storage medium (e.g., the computer-readable storage media 1406) for storing computer-readable instructions (e.g., the information 1408). One or more hardware processors (e.g., the hardware processors 1104) execute the computer-readable instructions to perform any of the methods described herein (e.g., any of the methods A1-12, B1, or C1).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface (UI) presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1414 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, executed by a computing system, for facilitating interaction among communication participants, comprising:

providing a user interface (UI) presentation using a UI-generating service component, the UI presentation providing a mechanism for interaction with at least one application;

instructing, by a background UI-monitoring component, a UI-exposing service component to monitor occurrence of one or more triggering events in the UI presentation, the UI-exposing service component expressing contents of the UI presentation as a hierarchical data structure of UI features that appear in the UI presentation, the UI-exposing service component providing an application programming interface by which plural consuming applications, including the background UI-monitoring component, interact with the UI-exposing service component;

receiving, by the background UI-monitoring component, an indication from the UI-exposing service component that a particular triggering event, of said one or more triggering events, has occurred in response to interaction by a user with the UI presentation in a predetermined manner, the UI-exposing service component detecting that the triggering event has occurred by detecting a change in the hierarchical data structure;

receiving, by the background UI-monitoring component, context information from the UI-exposing service component that describes a current context associated with the particular triggering event, the UI-exposing service component extracting the context information from the hierarchical data structure;

generating, by the background UI-monitoring component, a request based on the context information, and sending the request to a graph service, the graph service having access to a graph that specifies relationships among a plurality of nodes;

receiving, by the background UI-monitoring component, collaboration information from the graph service, the graph service producing the collaboration information by interacting with the graph in response to the request, the collaboration information identifying one or more candidate participants who are relevant to the current context;

generating, by the background UI-monitoring component, a UI collaboration pane that identifies said one or more candidate participants, the UI collaboration pane providing access to plural communication modes for interacting with said one or more candidate participants; and requesting, by the background UI-monitoring component, the UI-generating service component to display the UI collaboration pane on one part of the UI presentation.

2. The method of claim 1, wherein the particular triggering event involves opening a document.

3. The method of claim 1, wherein the particular triggering event involves interaction with the UI presentation to contact a communication participant.

4. The method of claim 1, wherein the particular triggering event involves interaction with a specified field of a message being composed that is presented on the UI presentation.

5. The method of claim 1, wherein the UI-exposing service component represents the UI features in the UI presentation as a hierarchical arrangement of nodes in the hierarchical data structure.

6. The method of claim 1, wherein the UI presentation shows a document with which the user is currently interacting, and wherein the context information returned by the UI-exposing service component to the background-monitoring component specifies a document title associated with the document.

7. The method of claim 6, wherein the one or more candidate participants include one or more direct collaborators, the graph service identifying said one or more direct collaborators in response to discovering one or more respective people-related nodes that are associated with said one or more direct collaborators and that are directly connected to a title node that is associated with the document title.

8. The method of claim 7, wherein the one or more candidate participants include an indirect collaborator, the graph service identifying the indirect collaborator in response to discovering a respective people-related node that is associated with the indirect collaborator and that is connected to a topic node, wherein the topic node is directly connected to the title node associated with the document title.

9. The method of claim 1, wherein a particular communication mode among the plurality of communication modes allows the user to add a particular candidate participant, of said one or more candidate participants, to a synchronous communication session, wherein activation of the particular communication mode in the UI collaboration pane will invoke a call to the particular candidate participant.

10. The method of claim 1, wherein a particular communication mode among the plurality of communication modes allows the user to send a text message to a particular candidate participant, of said one or more candidate participants, wherein activation of the particular communication mode will cause the text message to be automatically populated with an identifier of the particular candidate participant.

11. The method of claim 1, wherein a particular communication mode among the plurality of communication modes allows the user to send a voice recording to a particular candidate participant, of said one or more candidate participants, wherein activation of the particular communication mode will cause the voice recording to commence.

12. The method of claim 1, wherein a particular communication mode among the plurality of communication modes allows the user to send a screen capture recording to a particular candidate participant, of said one or more candidate participants, wherein activation of the particular communication mode will cause the screen capture recording to commence.

13. The method of claim 1, further including, after receiving an indication that the particular triggering event has occurred, instructing, by the background UI-monitoring component, the UI-exposing service component to provide the context information.

14. The method of claim 1, further including:

receiving, by the background UI-monitoring component, event configuration information from an entity, the event configuration information specifying the one or more triggering events in the UI presentation to be monitored, and the context information to be provided; and forwarding information, by the background UI-monitoring component, regarding the one or more triggering events to be monitored to the UI-exposing service component.

15. A computing system that facilitates interaction among communication participants, comprising:

a memory storing machine-readable instructions; and one or more hardware processors that perform operations by executing the machine-readable instructions, the operations including:

providing a user interface (UI) presentation using a UI-generating service component, the UI presentation providing a mechanism for interaction with at least one application;

instructing, by a background UI-monitoring component, a UI-exposing service component to monitor occurrence of one or more triggering events in the UI presentation, the UI-exposing service component expressing contents of the UI presentation as a hierarchical data structure of UI features that appear in the UI presentation, the UI-exposing service component providing an application programming interface by which plural consuming applications, including the background UI-monitoring component, interact with the UI-exposing service component;

receiving, by the background UI-monitoring component, an indication from the UI-exposing service component that a particular triggering event, of said one or more triggering events, has occurred in response to interaction by a user with the UI presentation in a predetermined manner, the UI-exposing service component detecting that the triggering event has occurred by detecting a change in the hierarchical data structure;

receiving, by the background UI-monitoring component, context information from the UI-exposing service component that describes a current context associated with a particular triggering event that has occurred, the UI-exposing service component extracting the context information from the hierarchical data structure, the particular triggering event involving interaction by the user with a document on the UI presentation in a specified manner, and wherein the context information specifies a document title associated with the document;

generating, by the background-monitoring component, a request based on the context information, and sending the request to a graph service, the graph service having access to a graph that specifies relationships among a plurality of nodes;

receiving, by the background-monitoring component, collaboration information from the graph service, the graph service producing the collaboration information by interacting with the graph in response to the request, the collaboration information identifying one or more candidate participants who are relevant to the current context, each of said one or more candidate participants having a corresponding people-related node in the graph that is directly or indirectly linked to a title node that is associated with the document title of the document;

generating, by the background-monitoring component, a UI collaboration pane that identifies said one or more candidate participants, the UI collaboration pane also identifying plural communication modes for interacting with said one or more candidate participants; and requesting, by the background-monitoring component, the UI-generating service component to display the UI collaboration pane on a part of the UI presentation.

16. The computing system of claim 15, wherein a particular candidate participant, of said one or more candidate participants, is associated with a people-related node that is directly linked to the title node associated with the document title.

17. The computing system of claim 15, wherein a particular candidate participant, of said one or more candidate participants, is associated with a people-related node that is directly linked to a topic node associated with a topic that is relevant to the document, the topic node being directly linked to the title node associated with the document title.

18. The computing system of claim 15, wherein a particular communication mode among the plurality of communication modes allows the user to add a particular candidate participant, of said one or more candidate participants, to a communication session, wherein activation of the particular communication mode will invoke a call to the particular candidate participant to begin synchronous communication with the particular candidate participant, and wherein another particular communication mode among the plurality of communication modes allows the user to generate a recording of the communication session or generate a text message, and then to send the recording or text message to the particular candidate participant.

19. A computer-readable storage medium comprising computer-readable instructions stored thereon, that when executed by one or more hardware processors perform steps of:

instructing, by a background user-interface-monitoring (UI-monitoring) component, a UI-exposing service component to monitor occurrence of one or more triggering events in a UI presentation provided by a UI-generating service component, the UI presentation providing a mechanism for interaction with at least one application, the UI-exposing service component expressing contents of the UI presentation as a hierarchical data structure of UI features that appear in the UI presentation, the UI-exposing service component providing an application programming interface by which plural consuming applications, including the background UI-monitoring component, interact with the UI-exposing service component;

receiving, by the background UI-monitoring component, an indication from the UI-exposing service component that a particular triggering event, of said one or more triggering events, has occurred in response to interaction by a user with the UI presentation in a predetermined manner, the UI-exposing service component detecting that the triggering event has occurred by detecting a change in the hierarchical data structure;

receiving, by the background UI-monitoring component, context information from the UI-exposing service component that describes a current context associated with the particular triggering event that has occurred, the UI-exposing service component extracting the context information from the hierarchical data structure;

generating, by the background UI-monitoring component, a request based on the context information, and sending the request to a graph service, the graph service having access to a graph that specifies relationships among a plurality of nodes;

receiving, by the background UI-monitoring component, collaboration information from the graph service, the graph service producing the collaboration information by interacting with the graph in response to the request, the collaboration information identifying one or more candidate participants who are relevant to the current context;

generating, by the background UI-monitoring component, a UI collaboration pane that identifies said one or more candidate participants, the UI collaboration pane also identifying plural communication modes for interacting with said one or more candidate participants; and requesting, by the background UI-monitoring component, a UI-generating service component to display the UI collaboration pane on the UI presentation, wherein a particular communication mode among the plurality of communication modes allows the user to add a particular candidate participant, of said one or more candidate participants, to a synchronous communication session, wherein activation of the particular communication mode will invoke a call to the particular candidate participant, and wherein another particular communication mode among the plurality of communication modes allows the user to generate a recording of the communication session or to generate a text message, and then to send the recording or text message to the particular candidate participant.

20. The computer-readable storage medium of claim 19, wherein the recording is a voice recording or a screen capture recording that is commenced when the user activates the other particular communication mode.

* * * * *